US012694338B2

(12) United States Patent
Pham et al.

(10) Patent No.: US 12,694,338 B2
(45) Date of Patent: Jul. 28, 2026

(54) TECHNIQUES FOR TRAINING AND DEPLOYING A NAMED ENTITY RECOGNITION MODEL

(71) Applicant: Oracle International Corporation, Redwood Shores, CA (US)

(72) Inventors: Tuyen Quang Pham, Springvale (AU); Bhagya Hettige, Melbourne (AU); Gioacchino Tangari, Sydney (AU); Yakupitiyage Don Thanuja Samodhye Dharmasiri, Melbourne (AU); Thanh Long Duong, Seabrook (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 332 days.

(21) Appl. No.: 18/323,477

(22) Filed: May 25, 2023

(65) Prior Publication Data

US 2024/0062108 A1     Feb. 22, 2024

Related U.S. Application Data

(60) Provisional application No. 63/399,446, filed on Aug. 19, 2022.

(51) Int. Cl.
*G06N 20/00* (2019.01)
*G06F 40/205* (2020.01)
(Continued)

(52) U.S. Cl.
CPC ........... *G06N 20/00* (2019.01); *G06F 40/284* (2020.01); *G06F 40/295* (2020.01); *G06F 40/35* (2020.01); *G06F 40/205* (2020.01); *G06F 40/263* (2020.01)

(58) Field of Classification Search
CPC .... G06N 20/00; G06N 3/0455; G06F 40/284; G06F 40/295; G06F 40/35; G06F 40/205; G06F 40/263; G06F 40/30
See application file for complete search history.

(56) References Cited

U.S. PATENT DOCUMENTS 10,169,315 B1 * 1/2019 Heckel .................. G06F 40/166
11,501,084 B1 * 11/2022 Soleimani ............... G06F 40/30
(Continued)

OTHER PUBLICATIONS

Fernandes, Ivo André Domingues. "A deep learning approach to named entity recognition in portuguese texts." Master's thesis, Universidade do Porto (Portugal), 2018. (Year: 2018).*
(Continued)

*Primary Examiner* — Paras D Shah
*Assistant Examiner* — Mulugeta Tuji Dugda
(74) *Attorney, Agent, or Firm* — Kilpatrick Townsend & Stockton LLP

(57) ABSTRACT

Techniques are disclosed herein for training and deploying a named entity recognition model. The techniques include implementing a nested labeling scheme for named entities within the training data and then training a machine learning model on the training data The techniques further include extracting an entity hierarchy for a predicted class based on a hierarchical template associated with a composite label, where the predicted class is representative of multiple named entity classes comprising at least a parent class and a child class associated with the composite label. The techniques further include increasing the volume of training data via data mining for sequence tags in a language corpus and then training a machine learning model on the training data.

20 Claims, 10 Drawing Sheets

(51) Int. Cl.

| | |
|---|---|
| *G06F 40/284* | (2020.01) |
| *G06F 40/295* | (2020.01) |
| *G06F 40/35* | (2020.01) |
| *G06N 3/0455* | (2023.01) |
| *G06F 40/263* | (2020.01) |

(56) References Cited

U.S. PATENT DOCUMENTS

| | | | | |
|---|---|---|---|---|
| 11,669,740 B2 * | 6/2023 | Zhao | .................. | G06F 40/30 |
| | | | | 704/9 |
| 2021/0142164 A1 * | 5/2021 | Liu | .................. | G06F 40/40 |
| 2023/0245485 A1 * | 8/2023 | Rimchala | ............. | G06V 30/413 |
| | | | | 382/176 |

OTHER PUBLICATIONS

Dridan, Rebecca. Using minimal recursion semantics in Japanese question answering. University of Melbourne, Department of Computer Science and Software Engineering, 2006. (Year: 2006).*

R. Yin, Z. Zhou and Z. Gao, "A Joint Model for Hierarchical Nested Information Extraction," in IEEE Access, vol. 10, pp. 50985-50995, 2022, doi: 10.1109/ACCESS.2022.3172970. (May 2022) (Year: 2022).*

Ju , et al., "A Neural Layered Model for Nested Named Entity Recognition", Available Online at: https://aclanthology.org/N18-1131.pdf, Proceedings of the 2018 Conference of the North American Chapter of the Association for Computational Linguistics: Human Language Technologies, vol. 1, Jun. 2018, pp. 1446-1459.

Li , et al., "A Unified MRC Framework for Named Entity Recognition", Proceedings of the 58th Annual Meeting of the Association for Computational Linguistics, Jul. 5-10, 2020, pp. 5849-5859.

Strakova, et al., "Neural Architectures for Nested NER through Linearization", 10.18653/v1/P19-1527, Aug. 19, 2019, 6 pages.

Wang, et al., "Pyramid: A Layered Model for Nested Named Entity Recognition", In Proceedings of the 58th Annual Meeting of the Association for Computational Linguistics, Jul. 5-10, 2020, pp. 5918-5928.

* cited by examiner

500

ACCESS TRAINING DATA COMPRISING EXAMPLES WITH TOKENS
LABELED WITH MULTIPLE LABELS
505

CONCATENATE MULTIPLE LABELS FOR EACH TOKEN INTO A SINGLE
LABEL TO GENERATE MODIFIED TRAINING DATA
510

TRAIN A MODEL USING THE MODIFIED TRAINING DATA
515

DEPLOY AND USE THE MODEL TRAINED WITH THE MODIFIED
TRAINING DATA
520

600

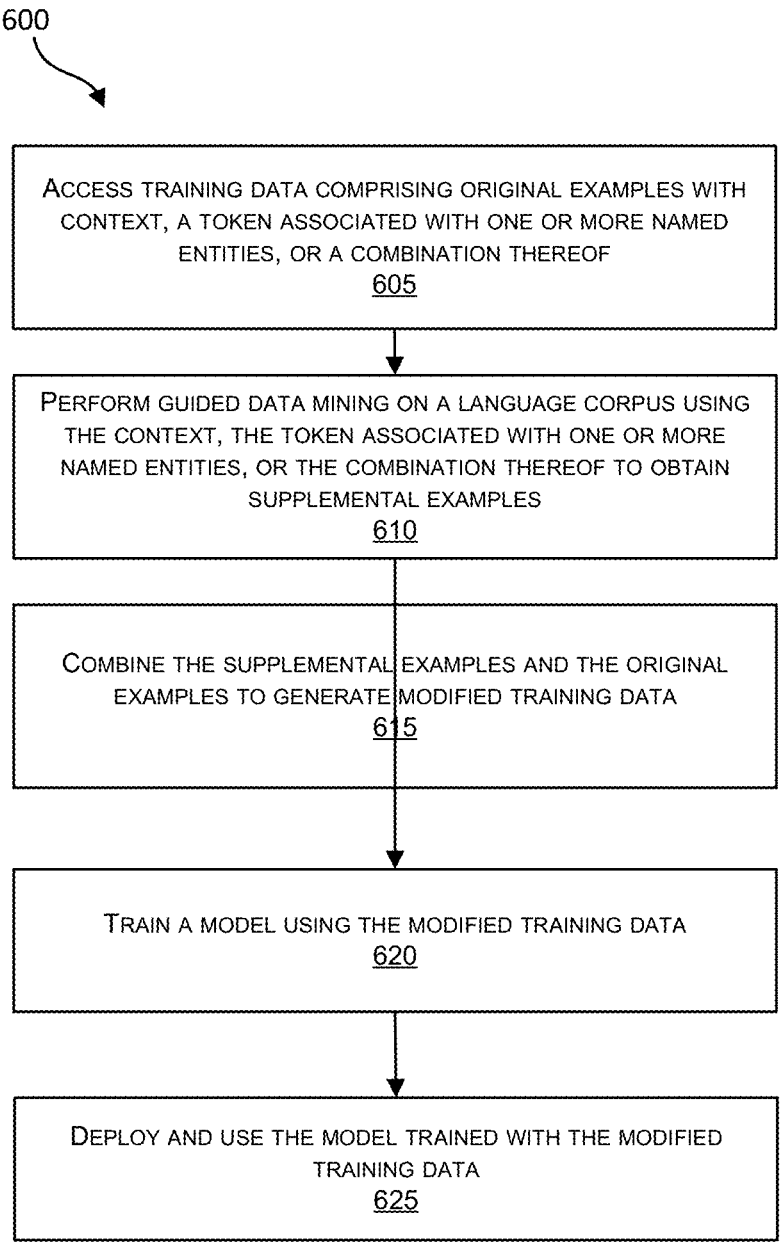

ACCESS TRAINING DATA COMPRISING ORIGINAL EXAMPLES WITH CONTEXT, A TOKEN ASSOCIATED WITH ONE OR MORE NAMED ENTITIES, OR A COMBINATION THEREOF
605

PERFORM GUIDED DATA MINING ON A LANGUAGE CORPUS USING THE CONTEXT, THE TOKEN ASSOCIATED WITH ONE OR MORE NAMED ENTITIES, OR THE COMBINATION THEREOF TO OBTAIN SUPPLEMENTAL EXAMPLES
610

COMBINE THE SUPPLEMENTAL EXAMPLES AND THE ORIGINAL EXAMPLES TO GENERATE MODIFIED TRAINING DATA
615

TRAIN A MODEL USING THE MODIFIED TRAINING DATA
620

DEPLOY AND USE THE MODEL TRAINED WITH THE MODIFIED TRAINING DATA
625

*FIG. 6*

TECHNIQUES FOR TRAINING AND DEPLOYING A NAMED ENTITY RECOGNITION MODEL

CROSS-REFERENCE TO RELATED APPLICATION

The present application is a non-provisional application of and claims benefit and priority under 35 U.S.C. 119(e) of U.S. Provisional Application No. 63/399,446, filed Aug. 19, 2022, the entire contents of which are incorporated herein by reference for all purposes.

FIELD

The present disclosure relates generally to named entity recognition, and more particularly, to techniques for training a named entity recognition model. The techniques include implementing a nested labeling scheme for named entities within the training data and increasing the volume of training data via data mining for sequence tags in a language corpus.

BACKGROUND

Artificial intelligence has many applications. To illustrate, many users around the world are on instant messaging or chat platforms in order to get instant reaction. Organizations often use these instant messaging or chat platforms to engage with customers (or end users) in live conversations. However, it can be very costly for organizations to employ service people to engage in live communication with customers or end users. Chatbots or bots have begun to be developed to simulate conversations with end users, especially over the Internet. End users can communicate with bots through messaging apps that the end users have already installed and used. An intelligent bot, generally powered by artificial intelligence (AI), can communicate more intelligently and contextually in live conversations, and thus may allow for a more natural conversation between the bot and the end users for improved conversational experience. Instead of the end user learning a fixed set of keywords or commands that the bot knows how to respond to, an intelligent bot may be able to understand the end user's intention based upon user utterances in natural language and respond accordingly.

However, artificial intelligence-based solutions, such as chatbots, can be difficult to build because many automated solutions require specific knowledge in certain fields and the application of certain techniques that may be solely within the capabilities of specialized developers. To illustrate, as part of building such chatbots, a developer may first understand the needs of enterprises and end users. The developer may then analyze and make decisions related to, for example, selecting data sets to be used for the analysis, preparing the input data sets for analysis (e.g., cleansing the data, extracting, formatting, and/or transforming the data prior to analysis, performing data features engineering, etc.), identifying an appropriate machine learning (ML) technique(s) or model(s) for performing the analysis, and improving the technique or model to improve results/outcomes based upon feedback. The task of identifying an appropriate model may include developing multiple models, possibly in parallel, iteratively testing and experimenting with these models, before identifying a particular model (or models) for use. Further, supervised learning-based solutions typically involve a training phase, followed by an application (i.e., inference) phase, and iterative loops between the training phase and the application phase. The developer may be responsible for carefully implementing and monitoring these phases to achieve optimal solutions. For example, to train the ML technique(s) or model(s), precise training data is required to enable the algorithms to understand and learn certain patterns or features (e.g., for chatbots—intent extraction and careful syntactic analysis, not just raw language processing) that the ML technique(s) or model(s) will use to predict the outcome desired (e.g., inference of an intent from an utterance). In order to ensure the ML technique(s) or model(s) learn these pattern and features properly, the developer may be responsible for selecting, enriching, and optimizing sets of training data and hyperparameters for the ML technique(s) or model(s).

BRIEF SUMMARY

Techniques disclosed herein relate generally to named entity recognition. More specifically and without limitation, techniques disclosed herein relate to techniques for training a named entity recognition model. The techniques include implementing a nested labeling scheme for named entities within the training data and increasing the volume of training data via data mining for sequence tags in a language corpus.

In various embodiments, a computer-implemented method is provided that includes: accessing training data comprising examples, where at least one of the examples comprise a token that is a hierarchical entity comprised of subsets of information and the token is labeled with multiple labels representing multiple named entity classes associated with the subsets of information; for each of the examples comprising the token labeled with the multiple labels, concatenating the multiple labels into a composite label representing the multiple named entity classes and associating the composite label with the token to obtain a modified set of training data; training a machine learning model on the modified set of training data, where the training comprises: iteratively inputting the examples from the modified set of training data into the machine learning model; predicting a class for a token recognized as a named entity in each of the examples, where, for the at least one of the examples, the recognized named entity is the hierarchical entity and the predicted class is representative of the multiple named entity classes; comparing the class predicted for the token in each of the examples to a label associated with the token, where, for the at least one of the examples, the token recognized as the hierarchical entity is associated with the composite label; and modifying model parameters of the machine learning model based on the comparing to minimize a difference between the class predicted for each token and the label associated with the token to generate a trained machine learning model; and providing the trained machine learning model.

In some embodiments, the predicting the class comprises: generating a sequence embedding for each of the examples; inputting the sequence embeddings into a first layer of the machine learning model; predicting, by the first layer, the class for the token recognized as the named entity in each of the examples, where the class is not representative of the composite label; outputting, by the first layer, logits representative of the predicted class for the token recognized as the named entity in each of the examples; combining the logits with the sequence embeddings, respectively, to obtain new sequence outputs; inputting the new sequence outputs into a second layer of the machine learning model; predicting, by the second layer, the class for the token recognized as the hierarchical named entity in the at least one of the examples, where the class is representative of the composite label; outputting, by the second layer, logits representative of the predicted class for the token recognized as the hierarchical named entity in the at least one of the examples; and generating a final class for the token in each of the examples based on the logits output from the first layer and the logits output from the second layer.

In some embodiments, the logits are combined with the sequence embeddings by applying a linear transformation on the logits and concatenating the result of the linear transformation with the sequence embeddings, respectively.

In some embodiments, the predicting the class further comprises: inputting the new sequence outputs into a third layer of the machine learning model; predicting, by the third layer, the class for the token as part of an interval or duration in the at least one of the examples, where the class is representative of the composite label; outputting, by the third layer, logits representative of the predicted class for the token as part of the interval or duration in the at least one of the examples; and generating a final class for the token in each of the examples based on the logits output from the first layer, the logits output from the second layer, and the logits output from the third layer.

In some embodiments, the composite label is an ordered sequence of the multiple labels for the multiple named entity classes.

In various embodiments, a computer-implemented method is provided that includes: receiving an utterance from a user; inputting the utterance into a trained machine learning model; predicting, by the machine learning model, a class for a token in the utterance, where the token is recognized as a hierarchical entity and the predicted class is representative of multiple named entity classes comprising at least a parent class and a child class associated with a composite label; extracting an entity hierarchy for the predicted class based on a hierarchical template associated with the composite label, where the entity hierarchy comprises the parent and child classes in a hierarchical structure; and generating a response to the utterance based on the entity hierarchy.

In some embodiments, the extracting the entity hierarchy comprises: accessing a matrix or database that maps hierarchical templates with composite labels, where the hierarchical templates are defined in a file format used to store and transmit data objects comprised of attribute-value pairs and arrays; identifying, using the matrix or database, the hierarchical template associated with the composite label; and disambiguating the predicted class into the entity hierarchy based on an attribute-value pair and array in the hierarchical template.

In some embodiments, the entity hierarchy lists out the parent and child classes in the hierarchical structure along with start and end information for a duration or interval child class.

In some embodiments, the generating the response comprises looking up information related to the token based on the entity hierarchy, generating dialogue with the user based on the entity hierarchy, or a combination thereof.

In various embodiments, a computer-implemented method is provided that includes: accessing training data comprising original examples, where each of the original examples comprises context, a token associated with one or more named entities, or a combination thereof; performing guided data mining on a language corpus using the context, the token associated with the one or more named entities, or the combination thereof from each of the original examples, where the guided data mining comprises: extracting a lexicon of words and values from the context, the token associated with the one or more named entities, or the combination thereof from the original examples; performing a query on a language corpus using the lexicon to obtain an initial set of supplemental data comprising examples having one or more of the words and values from the context, the token associated with the one or more named entities, or the combination thereof; and filtering some examples from the initial set of supplemental data to obtain a final set of supplemental data comprising supplemental examples, where each of the supplemental examples comprise context, a token associated with one or more named entities, or a combination thereof that is similar to the context, the token associated with the one or more named entities, or the combination thereof from the original examples; combining the supplemental examples with the original examples to generate modified training data; training a machine learning model on the modified training data to generate a trained machine learning model; and providing the trained machine learning model.

In some embodiments, the filtering comprises a hierarchy-based filtering for enterprise domain data, the hierarchy is analyzed and a list of domains which are related to the enterprise domain data is constructed, and the some examples are then filtered out from the initial set of supplemental data as out-of-domain data based on the list of domains.

In some embodiments, the guided data mining further comprises: generating embeddings for the original examples and the supplemental examples; comparing the embeddings for the original examples with the embeddings for the supplemental examples in a vector space using a vector similarity search technique; and retaining the supplemental examples with embeddings that are closest to the embeddings for the original examples as the final set of supplemental data, where the closest is defined by a predetermined distance threshold.

In various embodiments, a system is provided that includes one or more processors and one or more computer-readable media storing instructions which, when executed by the one or more processors, cause the system to perform part or all of one or more methods disclosed herein.

In various embodiments, one or more non-transitory computer-readable media are provided for storing instructions which, when executed by one or more processors, cause a system to perform part or all of one or more methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 6 is a process flow for increasing volume of training data through guided mining for sequence tagging in accordance with various embodiments.

DETAILED DESCRIPTION

Figure 1:
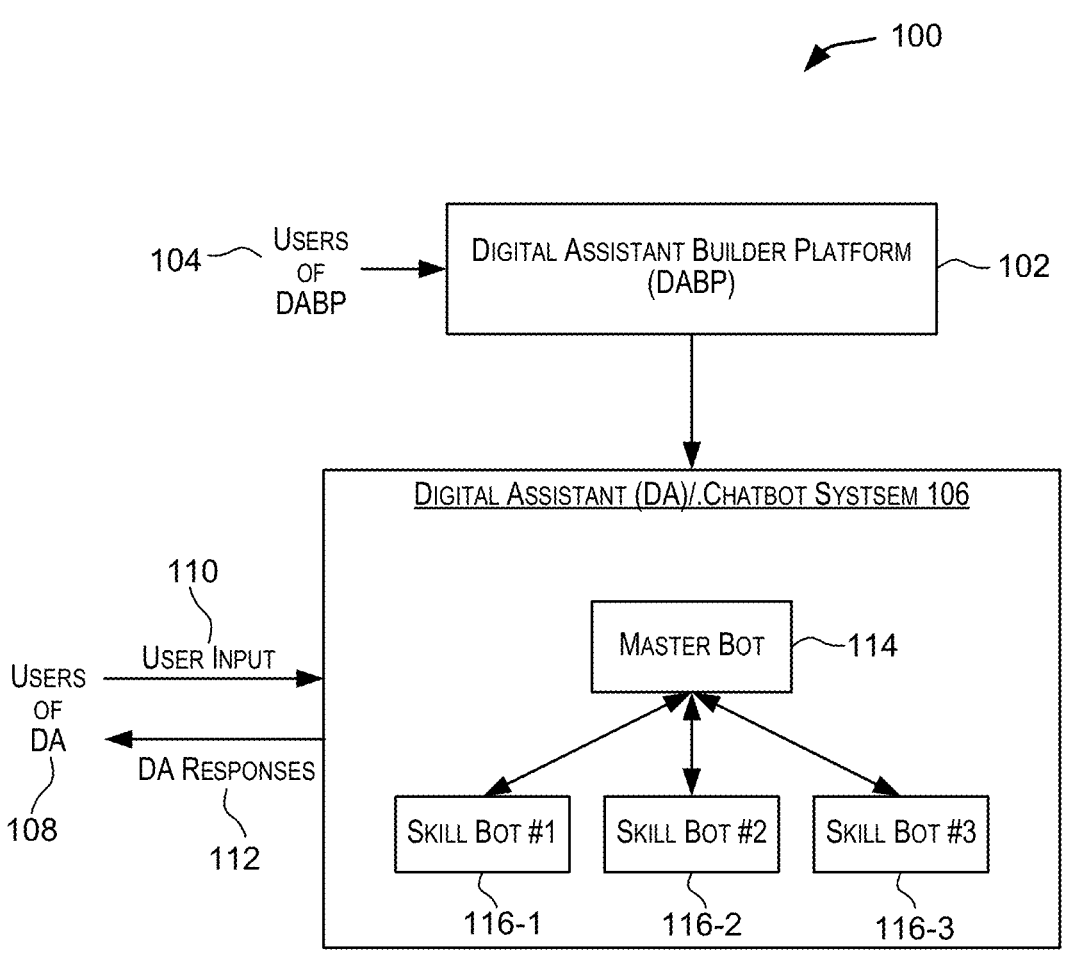
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Artificial intelligence techniques have broad applicability. For example, a digital assistant is an artificial intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting time cards, and creating expense reports. When an end user engages with the digital assistant, the digital assistant evaluates the end user input and routes the conversation to and from the appropriate chatbot. The digital assistant can be made available to end users through a variety of channels such as FACE-BOOK® Messenger, SKYPE MOBILE® messenger, or a Short Message Service (SMS). Channels carry the chat back and forth from end users on various messaging platforms to the digital assistant and its various chatbots. The channels may also support user agent escalation, event-initiated conversations, and testing.

Intents allow artificial intelligence-based technology such as a chatbot to understand what the user wants the chatbot to do. Intents are the user's intention communicated to the chatbot via user requests and statements, which are also referred to as utterances (e.g., get account balance, make a purchase, etc.). As used herein, an utterance or a message may refer to a set of words (e.g., one or more sentences) exchanged during a conversation with a chatbot. Intents may be created by providing a name that illustrates some user action (e.g., order a pizza) and compiling a set of real-life user statements, or utterances that are commonly associated with triggering the action. Because the chatbot's cognition is derived from these intents, each intent may be created from a data set that is robust (one to two dozen utterances) and varied, so that the chatbot may interpret ambiguous user input. A rich set of utterances enables a chatbot to understand what the user wants when it receives messages like "Forget this order!" or "Cancel delivery!"—messages that mean the same thing, but are expressed differently. Collectively, the intents, and the utterances that belong to them, make up a training corpus for the chatbot. By training a model with the corpus, a customer may essentially turn that model into a reference tool for resolving end user input to a single intent. A customer can improve the acuity of the chatbot's cognition through rounds of intent testing and intent training.

Utilization of artificial intelligence in the context of chatbots illustrates some of the challenges of application of artificial intelligence techniques. For example, building a chatbot that can determine the end users' intents based upon user utterances, is a challenging task in part due to the subtleties and ambiguity of natural languages and the dimension of the input space (e.g., possible user utterances) and the size of the output space (number of intents). As such, the chatbot may need to be trained, monitored, debugged, and retrained in order to improve the performance of the chatbot and user experience with the chatbot. In conventional systems, training systems are provided for training and retraining machine learning models of the digital assistant or chatbot in spoken language understanding (SLU) and natural language processing (NLP). Conventionally, the models used for chatbot systems are trained in NLP with "manufactured" utterances for any intent. For example, the utterance "Do you do price changes?" may be used to train a classifier model of a chatbot system to classify this type of utterance as the intent—"Do you offer a price match." The training of models with manufactured utterances helps initially train the chatbot system for providing services and then the chatbot system may be re-trained once it is deployed and starts getting real utterances from users.

As part of the NLP processing for an utterance, the digital assistant is trained to understand the meaning of the utterance, which involves identifying one or more intents and one or more entities corresponding to the utterance. The entity extraction in the digital assistant has two phases: named entity recognition and entity resolution via the named entity recognizer. The particular training problem addressed here pertains to named entity recognition. Entities can be understood as nouns, and are often referred to as slots. Entities are typically things like date, time, cities, names, brands etc., (a few common entities used as examples herein are domain independent, called System Entities: PERSON, NUMBER, CURRENCY, DATE_TIME; however, it should be understood that this disclosure is not limited to these system entities and is applicable any entity type such as composite entities, entity roles, entity lists, and the like). For example with respect to a travel bot, capturing the cities of departure, destination, travel mode, price, dates and times is at the foundation of the interface. However, capturing the entities is a difficult task for the digital assistant because users enter data in various languages under various contexts and randomly in no particular order. The following Table 1 shows a couple of examples of the entity extraction problem input (utterances) and outputs (entities):

TABLE 1

| Input Utterance | Entity Extraction Output |
|---|---|
| $60 for a cab ride on 12/2 | CURRENCY: $60 |
| | TIME_DATE: 12/2 |
| show me rowland's directs | PERSON: rowland |

Yet, capturing these entities are important for the digital assistant to take action based on the user's intent.

Conventional training of models for entity recognition starts with pre-labeled data. In a supervised machine learning setting, particularly in this problem, the challenge is centered around the lack of sufficient training data with pre-labeled data for the models to learn from. More specific challenges to building a robust named entity recognition model for digital assistants are as follows: (i) entities such as PERSON and DATETIME are hierarchical entities that can be comprised of subsets of information such as PERSON: first name, last name, middle name, suffix, title, etc.; DATE-TIME: time, date, time of day with specified date, duration, etc., (ii) it would be advantageous to be able to expand these hierarchical entities into their subtypes but framing such entities as non-overlapping entities may be confusing to the named entity recognition (NER) model given the complex relationship between the subtypes, (iii) often the amount of targeted use case utterances provided by the customer for training a model is a handful of examples, and (iv) the model requires at least an order of magnitude higher number of examples to reliably perform a prediction. Any machine learning model is only as good as the pre-labeled training data it was trained on. Thus, the training data quality is at least partially determinative of the model behavior.

Accordingly, different approaches are needed to address these challenges and others. In order for a NER model to identify subtypes of entities for a given parent entity efficiently and accurately, the approaches described herein, for each token (i.e., named entity), produce a new label by concatenating all of the labels assigned to it into one. For example, for the token "Monday", which falls under parent entity—DATETIME and subtype or child entity—DATE, the new label is "DATETIME|DATE", similarly for token "3", which falls under parent entity—DATETIME and subtype or child entity TIME, the new label is "DATETIME|TIME". Given the current framework's limitation of only consuming a single label during training, the concatenated label allows for this limitation to be circumvented by acting as a proxy single label. Following prediction, a post-processing step is then performed to extract the entity hierarchy (parent and subtypes or children) from the concatenated single label. Additionally or alternatively, in order for a NER model to be trained on an increased volume of training examples in an efficient manner, the approaches described herein perform guided data mining within a language corpus to search for utterances that have similar context to targeted seed utterances and/or have similar entities to targeted use case utterances (including hierarchical entities). These utterances are then used to supplement the original training data and the supplemented training data is used for training a token classification model (e.g., a named entity recognition model).

In various embodiments, a computer-implemented method is provided that includes: accessing training data comprising examples, where at least one of the examples comprise a token that is a hierarchical entity comprised of subsets of information and the token is labeled with multiple labels representing multiple named entity classes associated with the subsets of information; for each of the examples comprising the token labeled with the multiple labels, concatenating the multiple labels into a composite label representing the multiple named entity classes and associating the composite label with the token to obtain a modified set of training data; and training a machine learning model on the modified set of training data. The training comprises: iteratively inputting the examples from the modified set of training data into the machine learning model; predicting a class for a token recognized as a named entity in each of the examples, where, for the at least one of the examples, the recognized named entity is the hierarchical entity and the predicted class is representative of the multiple named entity classes; comparing the class predicted for the token in each of the examples to a label associated with the token, where, for the at least one of the examples, the token recognized as the hierarchical entity is associated with the composite label; and modifying model parameters of the machine learning model based on the comparing to minimize a difference between the class predicted for each token and the label associated with the token to generate a trained machine learning model. The trained machine learning model is then provided (e.g., deployed in a chatbot system).

In various embodiments, a computer-implemented method is provided that includes: receiving an utterance from a user; inputting the utterance into a trained machine learning model; predicting, by the machine learning model, a class for a token in the utterance, where the token is recognized as a hierarchical entity and the predicted class is representative of multiple named entity classes comprising at least a parent class and a child class associated with a composite label; extracting an entity hierarchy for the predicted class based on a hierarchical template associated with the composite label, where the entity hierarchy comprises the parent and child classes in a hierarchical structure; and generating a response to the utterance based on the entity hierarchy.

In various embodiments, a computer-implemented method is provided that includes: accessing training data comprising original examples, where each of the original examples comprises context, a token associated with one or more named entities, or a combination thereof; and performing guided data mining on a language corpus using the context, the token associated with the one or more named entities, or the combination thereof from each of the original examples. The guided data mining comprises: extracting a lexicon of words and values from the context, the token associated with the one or more named entities, or the combination thereof from the original examples; performing a query on a language corpus using the lexicon to obtain an initial set of supplemental data comprising examples having one or more of the words and values from the context, the token associated with the one or more named entities, or the combination thereof; and filtering some examples from the initial set of supplemental data to obtain a final set of supplemental data comprising supplemental examples. Each of the supplemental examples comprise context, a token associated with one or more named entities, or a combination thereof that is similar to the context, the token associated with the one or more named entities, or the combination thereof from the original examples. The computer-implemented method further includes combining the supplemental examples with the original examples to generate modified training data, training a machine learning model on the modified training data to generate a trained machine learning model, and providing the trained machine learning model (e.g., deploying in a chatbot system).

As used herein, when an action is "based on" something, this means the action is based at least in part on at least a part of the something. As used herein, the terms "similarly", "substantially," "approximately" and "about" are defined as being largely but not necessarily wholly what is specified (and include wholly what is specified) as understood by one of ordinary skill in the art. In any disclosed embodiment, the term "similarly", "substantially," "approximately," or "about" may be substituted with "within [a percentage] of" what is specified, where the percentage includes 0.1, 1, 5, and 10 percent.

Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can be communicated by various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child(or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
   (1) Configuring settings for a new skill bot
   (2) Configuring one or more intents for the skill bot
   (3) Configuring one or more entities for one or more intents
   (4) Training the skill bot
   (5) Creating a dialog flow for the skill bot
   (6) Adding custom components to the skill bot as needed
   (7) Testing and deploying the skill bot
Each of the above steps is briefly described below.
   (1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.
   (2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.
   (3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.
   (4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section (b) a default transitions section (c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
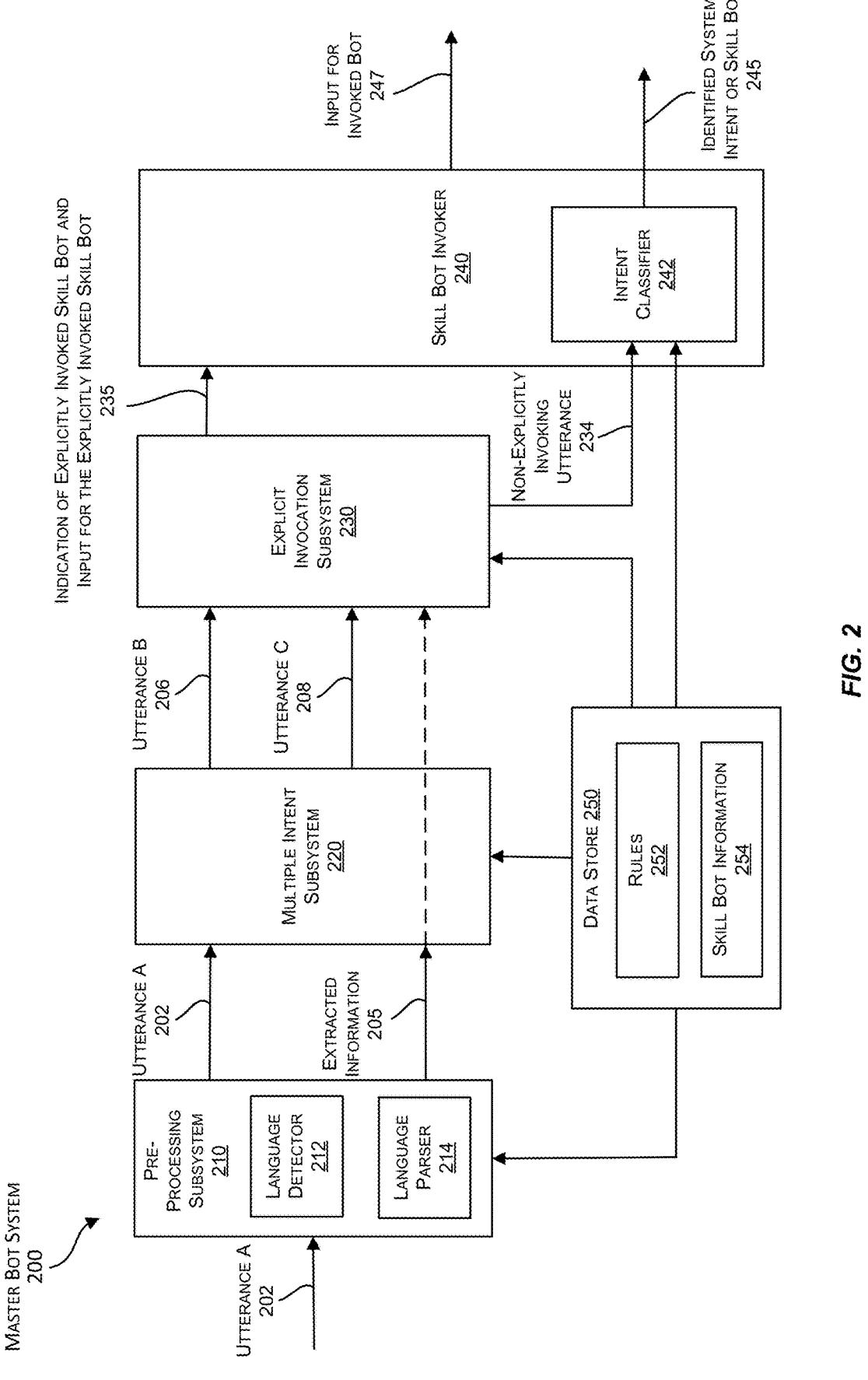
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
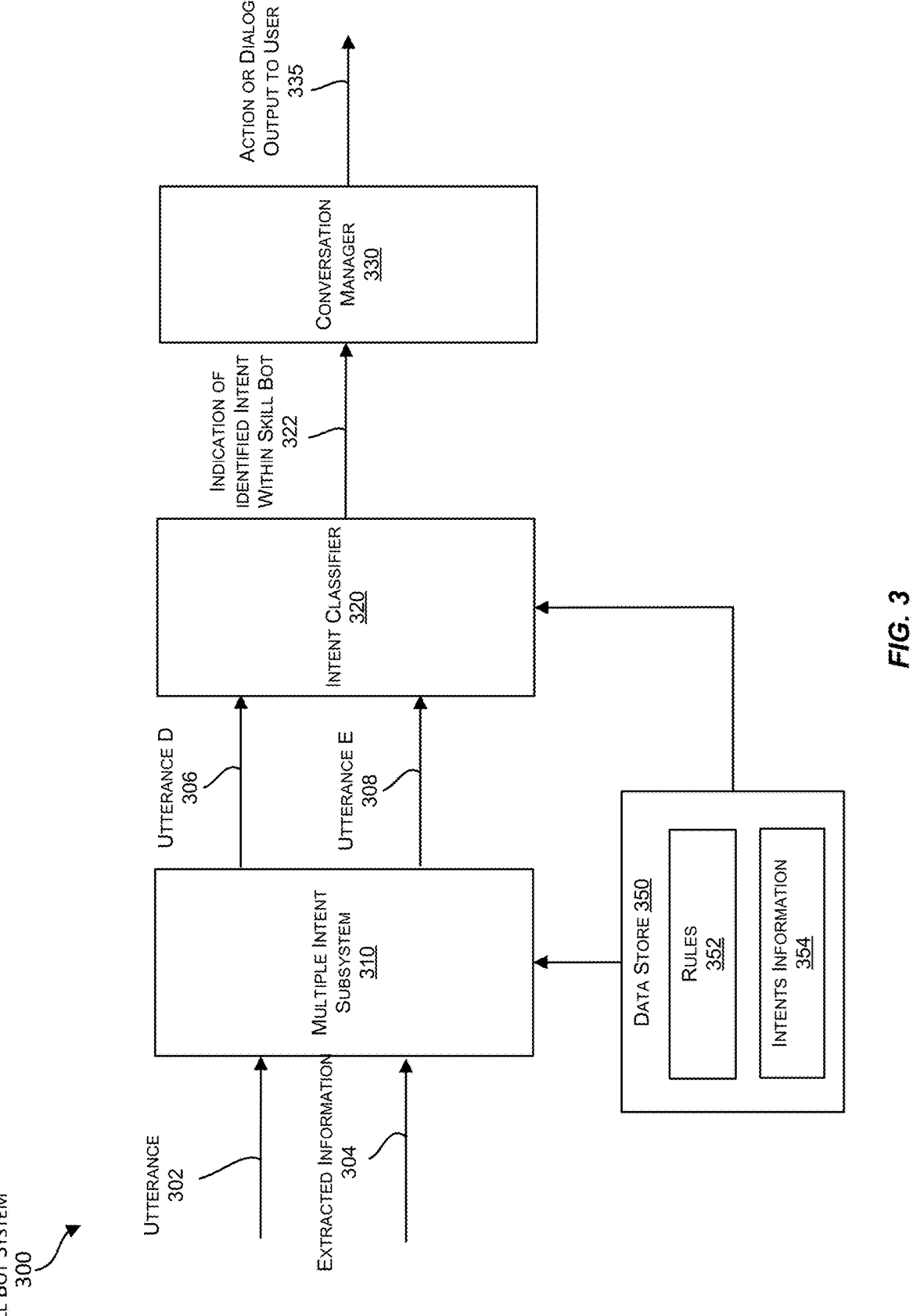
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine learning model) can be stored as part of skill bot information 254.

In certain embodiments, the intent classifier 242 is implemented using a machine learning model, as described in further detail herein. Training of the machine learning model may involve inputting at least a subset of utterances from the example utterances associated with various skill bots to generate, as an output of the machine learning model, inferences as to which bot is the correct bot for handling any particular training utterance. For each training utterance, an indication of the correct bot to use for the training utterance may be provided as ground truth information. The behavior of the machine learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot.

In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine learning model. The machine learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Named Entity Recognition Training and Deployment System

It has been discovered that models used for entity recognition and extraction provide poor results on hierarchical entities expressed as non-ovelapping entities. It has also been discovered that models used for entity recognition and extraction provide poor results when the model is only trained on a handful of examples (e.g., less than 30 examples). In order to overcome these problems and others, various embodiments are directed to techniques for labeling the hierarchical entities to maintain the complex hierarchical relationship information for the entities and/or supplementing training data with examples obtained from guided data mining to increase the volume of the training data. By labeling training data and/or supplementing the training data with the techniques described herein, the models become more efficient and accurate at entity recognition and extraction. The models trained on training data comprising the labels for the hierarchical entities and/or supplemental training data may be implemented in an artificial intelligence based system such as a chatbot system, as described with respect to FIGS. 1, 2 and 3. Advantageously, these models and artificial intelligence based systems perform better on utterances in various languages and/or text formats because the models and systems are better able to recognize and extract entities within the utterances. Moreover, because the labeling and/or supplementing are applied automatically in a synthetic agnostic manner, the customer or client does not need to be concerned about manually adding utterances in various languages and/or text formats to the training data.

Figure 4A:
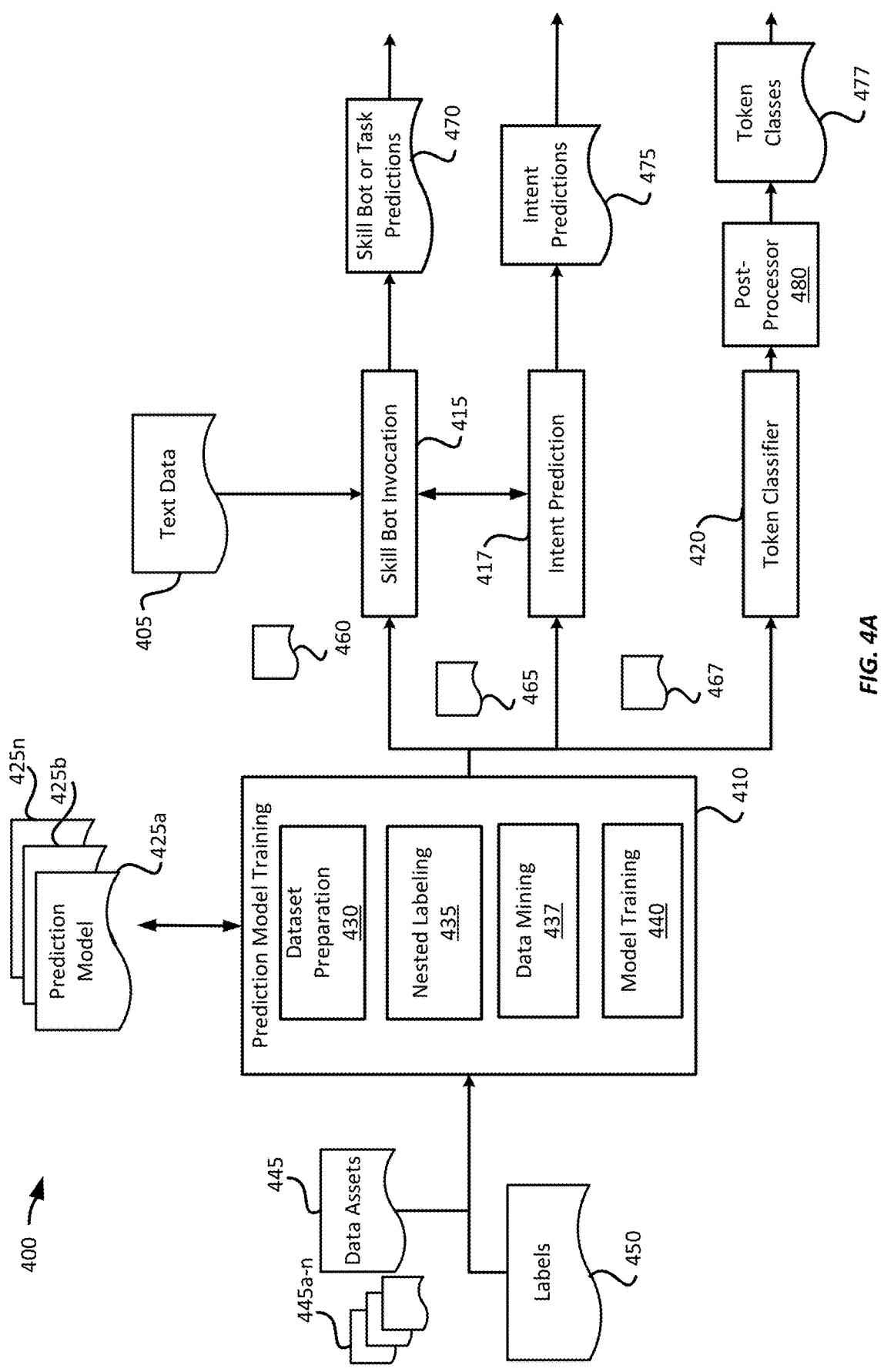
FIG. 4A is a simplified block diagram of a training and deployment system in accordance with various embodiments.

FIG. 4A shows a block diagram illustrating aspects of a model system 400 configured for training and deploying machine learning models, e.g., a machine learning model implemented as a token classifier (e.g., a NER model) based on text data. Token classification is a natural language understanding task in which a label is assigned to some tokens in a text. For example, in NER a label identifying a named entity is assigned to one or more tokens. Tokens are the building blocks of natural language. Tokens can be either words, characters, or subwords. Thus, tokenization or the process or task used to generate tokens is a way of separating a piece of text into smaller units called tokens and can be broadly classified into 3 types—word, character, and subword (n-gram characters) tokenization. As shown in FIG. 4A, the token classification performed by the model system 400 in this example includes various stages: a machine learning model training stage 410 to build and train models, a skill bot invocation stage 415 to determine a likelihood that an utterance is representative of a task that a particular skill bot is configured to perform, an intent prediction stage 417 for classifying utterances as one or more intents, and a token classification stage 420 for classifying tokens, for example, with a named entity label. The machine learning model training stage 410 builds and trains one or more machine learning models 425a-425n ('n' represents any natural number) to be used by the other stages (which may be referred to herein individually as a machine learning model 425 or collectively as the machine learning models 425). For example, the machine learning models 425 can include a model for classifying tokens as one or more entities in an utterance, another model for determining a likelihood that an utterance is representative of a task that a particular skill bot is configured to perform, another model for predicting an intent from an utterance for a first type of skill bot, and another model for predicting an intent from an utterance for a second type of skill bot. Still other types of machine learning models may be implemented in other examples according to this disclosure.

A machine learning model 425 may be a deep learning model, such as a convolutional neural network ("CNN"), e.g. an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier for single intent classification. A machine learning model 425 can also be any other suitable ML model trained for natural language processing, such as a Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network). The chatbot system 400 may employ the same type of machine learning model or different types of machine learning models for classifying tokens as one or more entities in an utterance, determining a likelihood that an utterance is representative of a task that a particular skill bot is configured to perform, predicting an intent from an utterance for a first type of skill bot, and predicting an intent from an utterance for a second type of skill bot. Still other types of machine learning models may be implemented in other examples according to this disclosure.

To train the various machine learning models 425, the training stage 410 is comprised of four main subsystems or services: dataset preparation 430, nested labeling 435, data mining 437, and model training 440. The dataset preparation 430 is configured to load data assets 445, split the data assets 445 into training and validation sets 445 *a-n* so that the system can train and test the machine learning models 425, and perform basic natural language pre-processing (e.g., tokenization). The data assets 445 include natural language example utterances (e.g., natural language questions/requests). In some instances, the example utterances are associated with various domains or skill bots (e.g., travel or an airline ticketing skill). As indicated above, an utterance can be provided in various ways including audio or text. The utterance can be a sentence fragment, a complete sentence, multiple sentences, a string of text, and the like. For example, if the utterance is provided as audio, the data preparation 430 may convert the audio to text using a speech-to-text converter (not shown) that inserts punctuation marks into the resulting text, e.g., commas, semicolons, periods, etc. In some instances, the data assets 445 can be accessed from one or more sources such as a database (not shown), a computing system (e.g., data preprocessing subsystem), or the like. In some instances, the data assets 445 are provided by a client or customer. In other instances, the example utterances are automatically generated from prior libraries of utterances (e.g., identifying utterances from a library that are specific to a skill that a chatbot is designated to learn).

Once the data assets 445 are obtained, the datasets may be split into training and validation sets 445 *a-n*. The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting.

Before or after splitting, basic natural language pre-processing may be performed on the data assets 445. In some instances, the pre-processing includes tokenizing the utterances. Tokenizing is splitting a phrase, sentence, para-graph, or an entire text document into smaller units, such as individual words or terms. Each of these smaller units are called tokens. Smaller units are created by locating bound-aries such as word boundaries, which are the ending point of a word and the beginning of the next word. For example, the text "How many employees work for company X" can be word tokenized into 'How', 'many', 'employees', 'work', 'for', 'company', 'X'. These tokens help the model to understand the context and develop the model for a given task. There are various tokenization techniques which can be used for executing the tokenizing based on the language and modeling task. For example, the tokenizing may be per-formed using Natural Language ToolKit, white space tokeni-zation, dictionary-based tokenization, rule-based tokeniza-tion, Keras tokenization, Penn Tree based tokenization, spaCy tokenization, Moses tokenization, subword tokeniza-tion, or the like.

In some instances, the tokens for data assets 445 may then be embedded to sequence embeddings (e.g., word embed-dings or contextualized word embeddings). A word embed-ding is a learned representation for text where words that have the same meaning have a similar representation. Word embeddings are generated by embedding techniques where individual words are represented as real-valued vectors in a predefined vector space so they can be understood by deep learning algorithms. The embedding techniques can be joint or individual embedding techniques such as including an embedding layer within the deep learning algorithm or using a separate model such as a BERT-based pretrained language model (e.g., BERT, RoBERTa, and DeDERTa). BERT-based models are pretrained language models that use self-super-vised learning to learn the deep meaning of words and contexts. An embedding layer is a word embedding that is learned jointly with a neural network model on a specific natural language processing task, such as the natural lan-guage to logical form translation (e.g., the natural language-logical form (NL-LF) algorithm(s) 450). In some instances, word embedding techniques can be used such as Word2Vec or GloVe. Word2Vec is a statistical technique that uses a model such as Continuous Bag-of-Words or Continuous Skip-Gram Model for learning a standalone word embed-ding from a text corpus. GloVe, for Global Vectors, is a model for creating word embeddings based on the global corpus statistics. It is trained on the non-zero entries of a global word-word co-occurrence matrix, which tabulates how frequently words co-occur with one another in a given corpus. In NER having knowledge of context is can be important which may not be achieved by traditional word embeddings such as (GloVe, fasttext, Word2Vec etc.). Con-sequently, in some instances, contextualized word embed-ding techniques can be used such as Embeddings from Language Models (ELMO), Multi-layer Perceptron classi-fier (MLP), Bidirectional RNN, CNN, transformers, and the like.

The training data 445a may include at least a subset of utterances from the example utterances. The training data 445a for a machine learning model 425 can include input text or audio (or input features of text or audio frames) and labels 450 corresponding to the input text or audio (or input features) as a matrix or table of values. For example, for each training example, an indication of the correct token classification (e.g., named entity class such as PERSON, CURRENCY, DATE, or DATETIME) to be inferred by the machine learning model 425 for tokens is provided as ground truth information for labels 450. The behavior of the machine learning model 425 can then be adapted (e.g., through back-propagation) to minimize the difference between the generated inferences for various tokens and the ground truth information.

Nested Named Entity Labeling

Conventionally, all of the following '3 pm', 'Monday' and '3 pm on Monday' were each treated as a single entity DATETIME or '3 pm' was treated as a single entity TIME and Monday was treated as a single entity DATE. Addition-ally, all of the following 'Mr.', 'Jones', 'Brownstone', and 'Mr. Jones Brownstone' were each treated as a single entity PERSON. However, entities such as DATETIME and PER-SON are hierarchical entities that can be comprised of subsets of information such as DATETIME: time, date, time of day with specified date, duration, etc.; PERSON: first name, last name, middle name, surname, suffix, title, etc. As discussed herein it would be advantageous to be able to expand these hierarchical entities into their subtypes but framing such entities as non-overlapping entities may be confusing to the NER model given the complex relationship between the subtypes.

In order for a NER model to classify subtypes of entities for a given parent entity efficiently and accurately, the approaches described herein, generate a new label by con-catenating the original labels 450 assigned to a token into a single label for training the NER model to effectively classify the subtypes. If the token is a named entity with a single label assigned, then the token remains annotated with a single label for a named entity class (e.g., CURRENCY). If the token is a named entity with multiple labels assigned, then the token is reannotated with a concatenated or com-posite label for a hierarchical named entity class (e.g., DATETIME|DATE). For example, for the token "Monday", which falls under parent entity—DATETIME and subtype or child entity—DATE, the new label is "DATETIME|DATE", similarly for token "3", which falls under parent entity—DATETIME and subtype or child entity TIME, the new label is "DATETIME|TIME". By way of additional example, for the token "Jones", which falls under parent entity—PER-SON and subtype or child entity—FIRSTNAME, the new label is "PERSON|FIRSTNAME", similarly for the token "Brownstone", which falls under parent entity—PERSON and subtype or child entity LASTNAME, the new label is "PERSON|LASTNAME", and similarly for token "Mr.", which falls under parent entity—PERSON and subtype or child entity SURNAME, the new label is "PERSON|SUR-NAME". Given the conventional framework's limitation of only consuming a single label for a class during training, a concatenated label allows for this limitation to be circum-vented by acting as a proxy single label. The concatenated label is structured (i.e., a flat sequence structure) to create a training signal for the model to consume a composite or hierarchical entity such as DATETIME or PERSON com-prising a parent entity and one or more child entities.

The nested labeling 435 generates the new labels for tokens (i.e., those to be classified as named entities) extracted from examples of the training data 445a by concatenating the original labels 450 assigned to a token into a single class label. For example, words or tokens within the training data 445a to be classified as name entities may be labeled with labels 450 that support a nested labelling scheme (e.g., the word or token "Monday" can be assigned both named entity labels DATETIME and DATE). The nested labeling 435 combines the labels 450 into a concatenated label as a sequence of the labels 450. Consequently, during training, the model 425 treats the concatenated label as a single label for purposes of learning. Continuing with the above example, the nested labeling 435 combines the labels DATETIME and DATE for token "Monday" into DATETIME|DATE. Similarly, for the token "3 PM", the nested labeling 435 combines the labels DATETIME and TIME for token "3 PM" into DATETIME|TIME. In some instances, it should be understood that the labels 450 and/or the concatenated labels may include additional information such as BIO/IOB (short for inside, outside, beginning) tags for tagging tokens to provide location information (e.g., I-RECURRING|I-INTERVAL|B-TIME|B-START). The nested labeling 435 may be implemented manually by a user or automatically using software, hardware, or a combination of software and hardware to generate modified training data 445a comprising examples labeled with one or more concatenated or composite labels, as described in further detail herein. The original labels 450 and the concatenated labels effectively define the classes of named entities available for the model 425 to learn and classify tokens as recognized named entities (nonhierarchical and hierarchical).

Consequently, a model trained using the nest labeling approach will be able to predict the concatenated single label which comprises not only the parent class but also any subclasses for a token recognized as a named entity. Table 2 shows example predictions by a model trained using the nested labeling approach (following prediction a post-processing step is performed to extract the entity hierarchy from the concatenated single label described in further detail below).

TABLE 2

Model Prediction

```
{
    "originalString": "3 pm on Monday",
    "raw predictions:"
    [
        {
            "3" : B-DATETIME|B-TIME,
            "pm": "I-DATETIME|I-TIME"
            "on" : I-DATETIME,
            "Monday": "I-DATETIME|B-DATE"
        },
    ]
}
{
    "originalString": "every Tuesday 3 - 4 pm",
    "raw predictions:"
    [
        {
            "every" : B-RECURRING,
            "Tuesday": I-RECURRING|B-INTERVAL|B-
DATE|B-START
            "3" : I-RECURRING|I-INTERVAL|B-
TIME|B-START,
            "-": I-RECURRING|I-INTERVAL,
            "4": I-RECURRING|I-INTERVAL|B-TIME|B-
END,
            "PM" : I-RECURRING|I-INTERVAL|I-TIME|I-END
        },
    ]
}
```

Guided Data Mining

The data mining 437 supplements the training data 445a to include examples that have similar context and/or similar entities (including hierarchical entities) as the examples (also referred to herein as seeds) in the training data 445a to make the predictive model 425 more resilient towards text in various contexts and/or text formats. Similarity with respect to context and entities should be understood as being largely but not necessarily wholly a same meaning (i.e., synonyms, tautology, pleonasm, or the like) as understood by one of ordinary skill in the art. The supplementing is performed using guided data mining of a language corpus to search for all example (e.g., utterances) that have similar context to targeted seed utterances, as shown in Table 3. The language corpus is any collection of linguistic data (for example, written, spoken, signed, or multimodal). In some instances, the language corpus is a text corpus, which is a large and unstructured set of text such as a repository of web crawl data (e.g., common crawl), an encyclopedia of data (e.g., Wikipedia), Project Gutenberg EBooks, Google Books Ngrams, and the like. Contextual support is important for named entity recognition because it helps the model to learn contextual dependencies and clues for detecting named entities from the given input text across various domain spaces.

TABLE 3

| Seed Utterance | Search Result |
|---|---|
| Schedule a meeting on Wednesday | Please schedule a sync-up on Friday |
| $25 taxi expense in Singapore | Metro charge 8 pounds in London |

Additionally or alternatively, the supplementing is performed using guided data mining of the language corpus to search for all examples (e.g., utterances) that have similar entities (nonhierarchical and hierarchical) to targeted use case utterances, as shown in Table 4. Variation in named entities is important for a model to categorize detected entities into a relevant predetermined entity class across various domain spaces.

TABLE 4

| Seed Utterance | Entities | Search Result |
|---|---|---|
| Schedule a meeting from Wednesday to Friday $25 food expense | INTERVAL: Wednesday to Friday CURRENCY: $25 | Conference will run Monday to Saturday Lunch $123 |

By supplementing the training data 445a with additional examples having diverse context and/or sets of entities in any format, the predictive model 425 becomes better at recognizing entities in various context and text formats.

The guided data mining is performed by extracting a lexicon of words and values from the context and/or named entities within the training data 445a (examples or seed utterances) such as "schedule" and "meeting" from "Schedule a meeting on Wednesday" and/or "Wednesday to Friday" from "Schedule a meeting from Wednesday to Friday." A lexicon is in general a collection of words and values used by people in a certain country and/or in a specific profession, hobby, area of interest, or domain. In the present instance, the lexicon includes keywords and other words (e.g., words classifiable as named entities) and values specific to the training data 445a (examples or seed utterances). Keywords are the ideas and topics that define what the example or seed utterance is about. In instances where the guided data mining is targeting examples with named entities similar to those in the training data 445a, the labels 450 and/or concatenated labels may be used to identify the named entities within each example for purposes of extracting the words or values associated with the named entities into the lexicon.

For example, the lexicon may include the following keywords and words classifiable as the named entity—TIMEDATE: ["the two days", "2001", "1935", "Saturday", "June", "the year", "36", "Thursday morning", "this month", "week", "Monday", "opening day", "Wednesday", "a year ago", "Friday", "late Friday", "the last six minutes", "1997", "26th", "earlier this week", "some 10 minutes", "noon (0900 GMT)", "April 14, 1912", "Tuesday", "Thursday", "last week", "season", "Sept 7", "Sunday", "last October 's", "this week", "this year", "1996", "December 16", "December 21", "just four minutes earlier", "barely two minutes", "24", "1995", "19th", "four years", "1951", "May", "the last five days", "pre-Soviet days", "August 20", "the third quarter", "today", "the second half of 1998", "six to 10 day", "the first seven months of the year", "the same period last year", "1995/96", "summer", "five or six months", "the weekend", "1958", "early next week", "January", "February", "46", "Sunday night", "3:31.526", "April", "May 30 next year", "Sept", "May 20", "earlier this year", "SATURDAY, AUGUST 31", "five years", "Today", "May 1994", "July 7", "next year", "the first quarter of 1996/97", "37", "36 hours", "1990", "71 days", "next week", "the end of this year", "1970", "27", "August last year", "September 21 to 26", "one year", "April 25", "17 days", "the last 11 days", "five year", "1991"].

Similarly the lexicon may include the following keywords and words classifiable as the named entity—LOCATION: ["Guinea", "Denmark", "China", "South America", "Middle East", "Africa", "Sudan", "Chad", "Colorado", "Indonesia", "Singapore", "Spain", "France", "Argentina", "Community of Madrid", "Calderon", "India", "U.S.", "Chile", "Belgium", "Syria", "Lebanon", "Japan", "Northern Ireland", "Madhumalla", "Arab East Jerusalem", "Austria", "Calcutta", "Gulf", "Egypt", "Istanbul", "Portugal", "Iran", "Australia", "Sweden", "WALES", "SAN MARINO", "Wimbledon", "Russia", "Italy", "Canada", "Kingdome", "Croatia", "Washington", "Finland", "Romania", "Baghdad", "Dayton", "Kenya", "Slovakia", "National Tennis Centre", "Newbury", "AZERBAIJAN", "SWITZERLAND", "Germany", "Leicester", "Barvikha", "Moscow", "Saudi Arabia", "Netherlands", "Faroe Islands", "Belarus", "South Africa", "Tirana", "Burma", "Europe", "Greece", "Cambodia", "Paris", "Poland", "Henry Hub"].

A query is then run on the language corpus using the lexicon to obtain an initial set of supplemental data (a set of examples having words and values that matched the keywords and words in the lexicon search). Some examples related to an enterprise domain identified using a lexicon for TIMEDATE include:

"49 days paid time off annually including 26 days paid vacation; 13 days of sick leave; 10 paid holidays"

"Jeff Barns, National Tax Leader, has been with the firm since 1956. Areas of focus include tax services and operations."

"Participation fee: $40.00. Cancellation Policy: 24 hours before the event. Advance payment is appreciated."

A filtering process is then performed on the initial set of supplemental data to obtain supplemental data (e.g., an intermediary or final set of supplemental data). The filtering may comprise a hierarchy-based filtering for enterprise domain data. In some instances, the hierarchy is a Directory Mozilla (DMOZ) hierarchy, which is a large-scale human-edited directory of the web. The hierarchy is analyzed and a list of domains which are related to enterprise domain data is constructed (e.g., expenses, human resources, employment, accounting, travel, etc.). Examples are then filtered out from the initial set of supplemental data as out-ofdomain data based on the list of domains (i.e., those examples having a domain as identified by the DMOZ not within the list of domains are removed from the initial set of supplemental data). The hierarchy filtering generates an intermediary or final set of supplemental data comprised of in-domain examples. Although the hierarchy-based filtering is broadly constructed for enterprise domain data, it should be understood that the domain data could be defined more narrowly to specific domains such as the airline industry, the restaurant industry, the clothing industry, construction, manufacturing, and the like.

The filtering may further comprise generating embeddings for the example or seed utterances and embeddings for the intermediary set of supplemental data. An embedding is a representation of the words in the example such as real-valued vectors in a lower dimensional space that encodes the meaning of the example such that examples that are closer in the vector space are expected to be similar in meaning. The embedding may be generated using a pre-trained embedder such as BERT. In some instances, the embeddings are Multilingual Unsupervised and Supervised Embeddings (MUSE). The embeddings for each example in the intermediary set of supplemental data are compared to the embedding for the example or seed utterance in a vector space using a vector similarity search technique such as FAISS or Elasticsearch. Those embeddings for examples in the intermediary set of supplemental data that are closest to the embedding for the example or seed utterance are retained as the final set of supplemental data. Closest is defined by a predetermined distance threshold or the like. For example, embeddings for examples in the intermediary set of supplemental data that are within a minimum distance to the embedding for the example or seed utterance are retained as the final set of supplemental data. The examples from the final set of supplemental data generated by the data mining 437 are added to the examples from the training data 445a to generate modified training data 445a (supplemented training data).

In some instances, the filtering further comprises one or more alternative or additional filtering steps such as Dual-Linear Model (LM) based filtering or named entity-based filtering using a trained NER model (e.g., a trained MeNER) with a skill bot and system NER data. For example, soft entity annotations may be applied to example in the intermediary set of supplemental data using a trained MeNER (with a portion of verified System NER data), and examples without any entity tag (soft entity annotation) may be filtered out from the intermediary set of supplemental data. The examples or seed utterances may then be categorized based on their intents and average MUSE embeddings may be generated for each intent class. A cosine similarity is then computed between each example in the intermediary set of supplemental data (with soft entity annotation filter applied) and each of the intent representations (average MUSE embeddings for each intent class). Examples in the intermediary set of supplemental data (with soft entity annotation filter applied) are then filtered out if they do not have similarity to at least one of the intent representations based on comparison to a predetermined threshold in order to obtain the final set of supplemental data. The examples from the final set of supplemental data generated by the data mining 437 are added to the examples from the training data 445a to generate modified training data 445a (supplemented training data).

Model Training Phase

The model training 440 performs the processes of determining hyperparameters for the models 425 and performing iterative operations of inputting examples from the modified training data 445*a* into the models 425 to find a set of model parameters (e.g., weights and/or biases) that minimizes an objective function(s) such as loss or error function for the models. The modified training data 445*a* may be modified as described with respect to concatenated or composite labels, supplemental training data, or a combination thereof. The hyperparameters are settings that can be tuned or optimized to control the behavior of the models. Most models explicitly define hyperparameters that control different features of the models such as memory or cost of execution. However, additional hyperparameters may be defined to adapt the models to a specific scenario. For example, regularization weight, strength of weights or biases, the number of hidden units of a model, the learning rate of a model, the convolution kernel width, or the number of kernels, and the like. The objective function can be constructed to measure the difference between the outputs inferred using the models and the ground truth annotated to the samples using the labels. For example, for a supervised learning-based model, the goal of the training is to learn a function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, the objective function may be defined that measures the difference between the ground truth value for input and the predicted value for that input. As part of training, techniques such as back propagation, random feedback, Direct Feedback Alignment (DFA), Indirect Feedback Alignment (IFA), Hebbian learning, and the like are used update the model parameters in such a manner as to minimize or maximize this objective function. In certain instances, a conditional random field is applied during training to block invalid predictions of labels such as invalid BIO tag transitions, for example, B-DATETIME|B-TIME and B-DATETIME|B-TIME for 3 PM (where the correct label would be B-DATETIME|B-TIME and I-DATETIME|I-TIME).

Figure 4B:
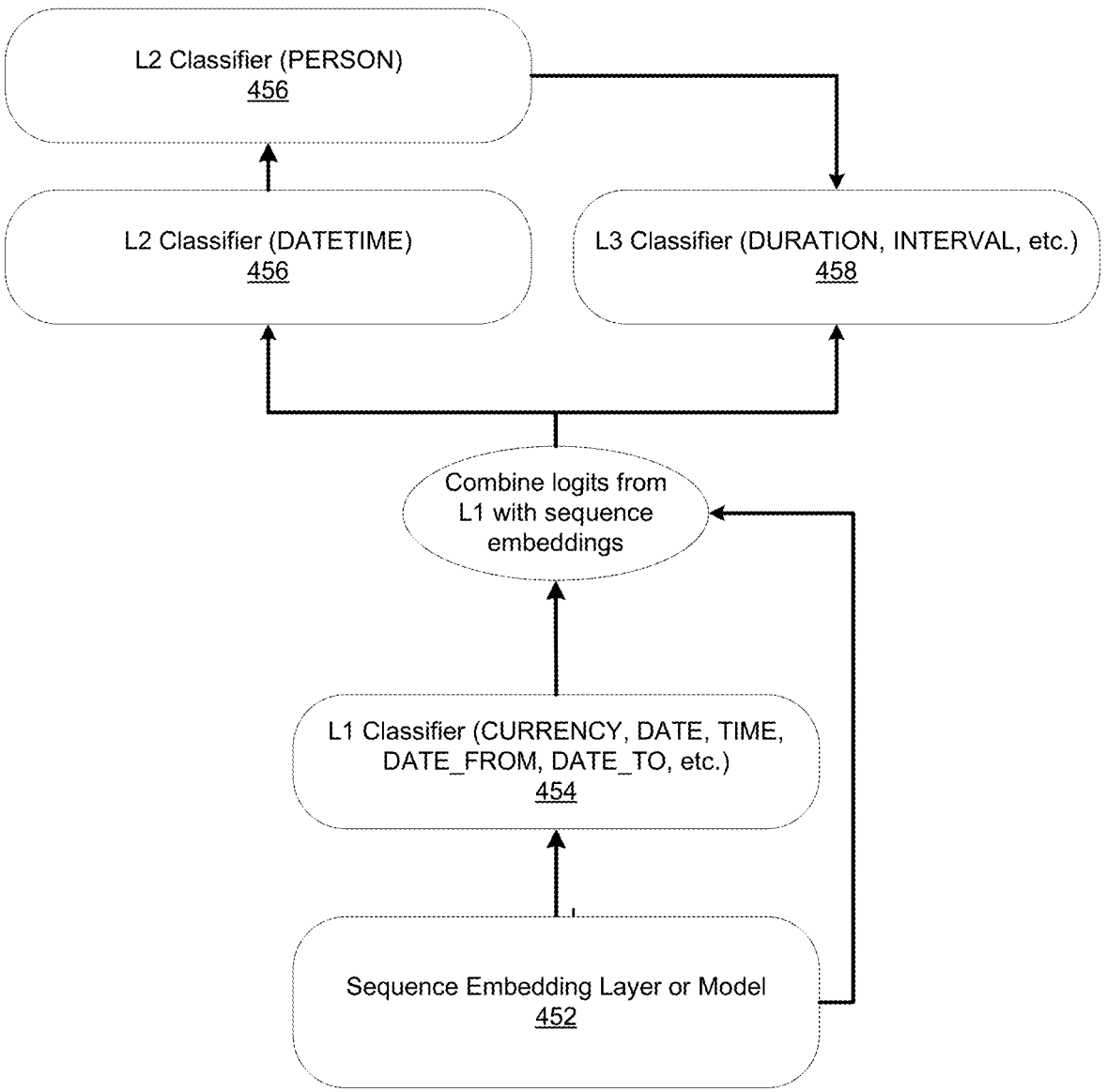
FIG. 4B is a simplified block diagram of a joint training workflow in accordance with various embodiments.

In some instances, a joint learning approach may be used to train the model 425 for predicting classes of named entities including hierarchical entities. As shown in FIG. 4B, an embedding layer or model 452 is used to generate sequence embeddings for a given training example. The sequence embeddings are input into a first NER classifier layer 454 (e.g., a flat NER layer) configured for classifying nonhierarchical named entities such as LOCATION, CURRENCY, DATE, TIME, DATE_FROM, DATE_TO, TIME_FROM, etc. The classes predicted by the first NER classifier layer 454 are not representative of composite labels. For example, for the utterance: "Jeff Barns, National Tax Leader, has been with the firm since October 1956. Areas of focus includes tax services and operations." the first NER classifier layer 454 would classify "Jeff Barns" as a PERSON, "since October 1956" as a DATE (or DATE-TIME) and DATE_FROM, and "tax services and operations" as a SERVICE.

The logits representative of the class predicted from the first NER layer 454 are then output and combined with the sequence embeddings, respectively, from the embedding layer or model 452 to obtain new sequence outputs. A logits layer such as the first NER layer 454 typically produces values from −infinity to +infinity representative of the predicted class. The logits may be combined with the sequence embedding by applying a linear transformation on the logits and concatenating the result of the linear transformation with the sequence embeddings, respectively.

The new sequence outputs are then fed separately into one or more second NER classifier layer(s) 456 and a third NER classifier layer 458. The one or more second NER classifier layer(s) 456 is configured for classifying hierarchical named entities such as DATETIME|TIME, PERSON| FIRST_NAME, etc. The classes predicted by the one or more second NER classifier layer(s) 456 are representative of composite labels. Continuing with the example above, for the utterance: "Jeff Barns, National Tax Leader, has been with the firm since October 1956. Areas of focus includes tax services and operations." the second NER classifier layers 456 would classify "Jeff Barns" as Jeff—PERSON-|FIRST_NAME and Barns—PERSON|LAST_NAME and "since October 1956" as DATETIME|DATE| DATE_FROM.

The third NER classifier layer 458 is configured for classifying the token as part of an interval or duration such as RECURRING|INTERVAL|TIME, DURATION|DATE, etc. The classes predicted by the THIRD NER classifier layer 458 are representative of composite labels. Continuing with the example above, for the utterance: "Jeff Barns, National Tax Leader, has been with the firm since October 1956. Areas of focus includes tax services and operations." The third NER classifier layer 458 would classify "since October 1956" as DURATION|DATE|DATE_FROM.

The new sequence outputs are fed into the one or more second NER classifier layers 456 and the third NER classifier layer 458 since knowing if a given token is a named entity may provide extra information that the sequence comprises a hierarchical named entity and/or a duration or interval. The logits from the first NER classifier layer 454, the one or more second NER classifier layers 456, and the third NER classifier layer 458 are then fed into a final softmax layer to transform the logits to values from 0 to 1 for classifying one or more named entities in the sequence.

Once a set of model parameters are identified, the model 425 has been trained and can be tested or validated using the subset of testing data 445*b* (testing or validation data set). The testing or validation process includes iterative operations of inputting utterances from the subset of testing data 445*b* into the model 425 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set from the subset of test data 445*a* may be input into the model 425 to obtain output (in this example, one or more recognized entities), and the output is evaluated versus ground truth entities using correlation techniques such as Bland-Altman method and the Spearman's rank correlation coefficients. Further, performance metrics may be calculated in the skill bot invocation stage 415, intent prediction stage 417, and/or the token classifier stage 417 such as the error, accuracy, precision, recall, receiver operating characteristic curve (ROC), etc. In some instances, the metrics may be used to analyze performance of the model 425 for predicting skills or task, intents, or classes of tokens.

Model Inference Phase

The machine learning model training stage 410 outputs trained machine learning models 425 including the task machine learning models 460, intent machine learning models 465, and token classification models 467. The task machine learning models 460 may be used in the skill bot invocation stage 415 to determine a likelihood that an utterance is representative of a task 470 that a particular skill bot is configured to perform, the intent machine learning models 465 may be used in the intent prediction stage 417 for classifying utterances as one or more intents 475, and the token classification models 467 may be used in the token classification stage 420 for predicting a class 477 for a token. In some instances, the skill bot invocation stage 415 and the intent prediction stage 417 may proceed independently in some examples with separate models. For example, trained intent machine learning models 465 may be used in the intent prediction stage 417 to predict intents for skill bots without first identifying the skill bots in the skill bot invocation stage 415. Similarly, the task machine learning models 460 may be used in the skill bot invocation stage 415 to predict tasks or skill bots to be used for utterances without identifying the intent of the utterances in the intent prediction stage 420. Similarly, the token classification models 467 may be used in the token classification stage 420 to predict classes 477 of tokens without identifying the intent of the utterances in the intent prediction stage 417 and/or without first identifying the skill bots in the skill bot invocation stage 415.

Alternatively, the skill bot invocation stage 415, the intent prediction stage 417, and the token classification stage 420 may be conducted sequentially with one stage using the outputs of the other as inputs or one stage being invokes in a particular manner for a specific skill bot based on the outputs of the other. For instance, for a given text data 405, a skill bot invoker can invoke a skill bot through implicit invocation using the skill bot invocation stage 415 and the task machine learning models 460. The task machine learning models 460 can be trained, using machine learning and/or rules-based training techniques, to determine a likelihood that an utterance is representative of a task that a particular skill bot 470 is configured to perform. Then for an identified or invoked skill bot and a given text data 405, the token classification stage 420 and the token classification models 467 can be used to classify the tokens of an utterance (e.g., utterance within given data asset 445). For example, used to classify named entities within an utterance such that the name entity can be used in looking up information concerning the named entity and/or crafting dialog between the chatbot and user in downstream processing. Then for an identified or invoked skill bot and a given text data 405, the intent prediction stage 417 and intent machine learning models 465 can be used to match a received utterance (e.g., utterance within given data asset 445) to an intent 475 associated with skill bot. As explained herein, a skill bot can be configured with one or more intents, each intent including at least one example utterance that is associated with the intent and used for training a classifier. In some embodiments, the skill bot invocation stage 415 and the task machine learning models 460 used in the master bot system are trained to determine confidence scores for individual skill bots and confidence scores for system intents. Similarly, the intent prediction stage 417 and intent machine learning models 465 can be trained to determine a confidence score for each intent associated with the skill bot system. Whereas the classification performed by the skill bot invocation stage 415 and the task machine learning models 460 is at the bot level, the classification performed by the intent prediction stage 417 and intent machine learning models 465 is at the intent level and therefore finer grained.

As shown in FIG. 4A, the token classifier stage 420 outputs model predictions to a post-processor 480 configured to extract and output the entity hierarchy (token classes 477) from each concatenated label. The model prediction for a token may be directed to a class representing a single named entity label such as CURRENCY, PERSON, DATE, TIME, NUMBER, etc. or a class representing a concatenated named entity label such as DATETIME|TIME, DATETIME|DATE, DATETIME|TIME|DURATION, etc. In the instance the prediction is a class representing a single label, post-processor 480 passes the label through as a final output (token class 477). In the instance the prediction is a class representing a concatenated label, post-processor 480 extracts or disambiguates the hierarchy (token classes 477) represented by the concatenated named entity label. For example, the concatenated named entity label DATETIME-|DATE and DATETIME|TIME for the tokens 'Thursday at 5 pm' would be disambiguated to named entity DATETIME comprising nested entity DATE for Thursday and TIME for 5 pm. The post-processor 480 extracts or disambiguates the hierarchy (token classes 477) based on a hierarchical template associated with the concatenated named entity label. For example, a matrix or database can be configured to associate the hierarchical templates with concatenated named entity labels such that given a predicted concatenated named entity label the post-processor 480 can use the matrix or database to obtain the associated hierarchical template and use the hierarchical template to extract the hierarchy (token classes 477). The hierarchical template may be defined as in a file format used to store and transmit data objects comprised of attribute—value pairs and arrays such as a j son object and the nested labels are mapped via the matrix or database to the corresponding data objects. Additional examples of extraction or disambiguation performed by post-processor 480 are shown in Table 5.

TABLE 5

| Model Prediction | Disambiguated Hierarchy |
|---|---|
| {<br>  "originalString": "3 pm on Monday",<br>  "raw predictions:"<br>  [<br>    {<br>      "3" : B-DATETIME\|B-TIME,<br>      "pm": "I-DATETIME\|I-TIME"<br>      "on" : I-DATETIME,<br>      "Monday": "I-DATETIME\|B-DATE" | {<br>  "originalString": "3 pm on Monday",<br>  "entityType": "DATETIME",<br>  "nestedEntities": [<br>    {<br>      "entityValue": "3 pm",<br>      "entityType": "TIME",<br>    },<br>    {<br>      "entityValue": "Monday",<br>      "entityType": "DATE",<br>    } |

TABLE 5-continued

| Model Prediction | Disambiguated Hierarchy |
|---|---|
| `},`<br>`]`<br>`}` | `] }` |
| `{`<br>  `"originalString": "every`<br>`Tuesday 3 - 4 pm",`<br>  `"raw predictions:"`<br>`[`<br>    `{`<br>      `"every" : B-`<br>`RECURRING,`<br>    `"Tuesday": I-`<br>`RECURRING\|B-INTERVAL\|B-`<br>`DATE\|B-START`<br>      `"3" : I-`<br>`RECURRING\|I-INTERVAL\|B-TIME\|B-`<br>`START,`<br>    `"-": I-RECURRING\|I-`<br>`INTERVAL,`<br>     `"4": I-`<br>`RECURRING\|I-INTERVAL\|B-TIME\|B-`<br>`END,`<br><br>    `"PM" : I-RECURRING\|I-`<br>`INTERVAL\|I-TIME\|I-END`<br>    `},`<br>  `]`<br>`}` | `{`<br>  `"originalString": "every Tuesday`<br>`3 - 4 pm",`<br>  `"entityType": "RECURRING",`<br>  `"nestedEntities": [`<br>  `{`<br>  `"endOffset": 30,`<br>  `"entityValue": "Tuesday 3 - 4 pm",`<br>  `"entityType": "INTERVAL"`<br>  `"matchedEntities": [`<br>  `{`<br>  `"entityValue": "Tuesday",`<br>  `"role": "START",`<br>  `"entityType": "DATE",`<br>  `},`<br>  `{`<br>  `"entityValue": "3",`<br>  `"role": "START",`<br>  `"entityType": "TIME",`<br>  `},`<br>  `{`<br>  `"entityValue": "4 pm",`<br>  `"role": "END",`<br>  `"entityType": "TIME",`<br>  `}`<br>  `}`<br>  `}` |

Figure 5:
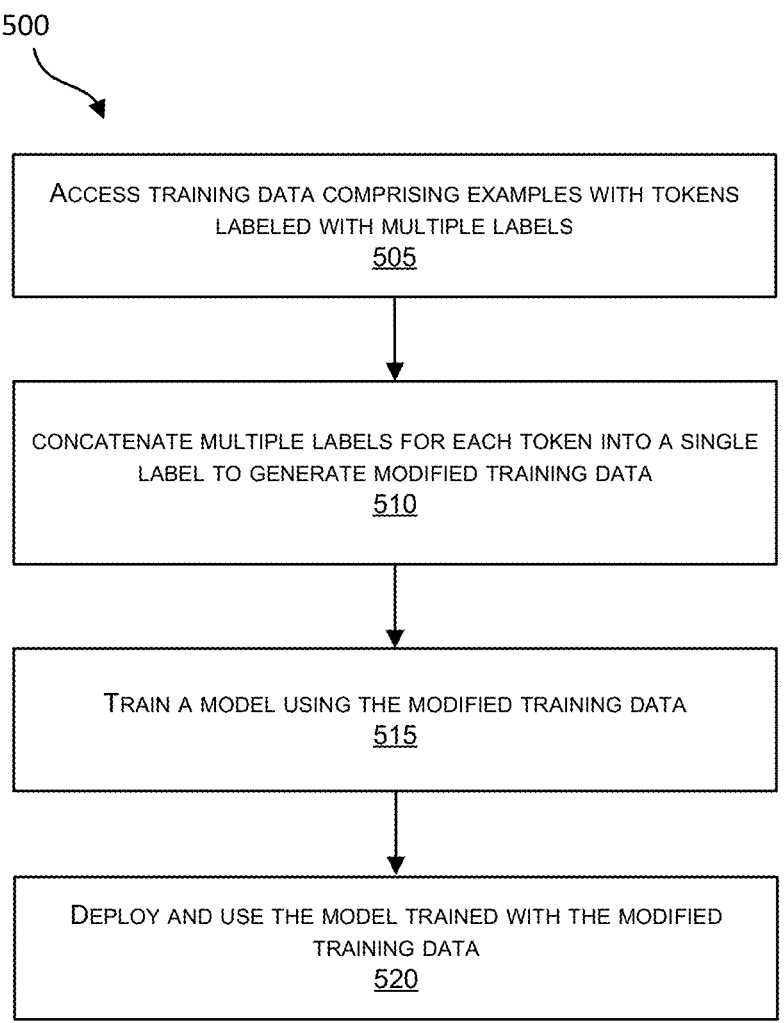
FIG. 5 is a process flow for casting nested named entity recognition as flat sequence labelling through a nested labelling scheme in accordance with various embodiments.

Techniques for Casting Nested Named Entity Recognition as Flat Sequence Labelling Through a Nested Labelling Scheme FIG. 5 is a flowchart illustrating a process 500 for casting nested named entity recognition as flat sequence labelling through a nested labelling scheme in accordance with various embodiments. The processing depicted in FIG. 5 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1-4B, the processing depicted in FIG. 5 may be performed by a system or subsystem (e.g., pre-processing subsystem 210 or model system 400) to create, train, update, and deploy one or more predictive models (implemented as a token classifier) using optionally supplemented training data sets.

At step 505, training data comprising examples is accessed. At least one of the examples comprise a token that is a hierarchical entity comprised of subsets of information and the token is labeled with multiple labels representing multiple named entity classes associated with the subsets of information. The token is a word, value, or phrase comprising multiple words, values, or combinations thereof.

At step 510, for each of the examples comprising the token labeled with the multiple labels, the multiple labels are concatenated into a composite label representing the multiple named entity classes and the composite label is associated with the token to obtain a modified set of training data. As should be understood, in an instance where there are multiple hierarchical entities, some or all of the hierarchical entities may be different from one another and thus some or all of the composite labels representing the multiple named entity classes may also be different from one another (e.g., DATETIME|TIME; INTERVAL|DATE|FROM, DURATION|DATE|TO; GPE|COUNTRY, GPE|CITY, GPE|STATE; DATETIME|B-TIME; RECURRING|I-INTERVAL|B-TIME|B-END; I-DATETIME|B-DATE; etc.). The multiple labels representing the multiple named entity classes are ground truth labels. The composite label is an ordered sequence of the multiple labels for the multiple named entity classes. More specifically, the composite label is an ordered flat sequence structure with the multiple labels listed in sequence from left to right. The sequence of the multiple labels may be predetermined/nonrandom (e.g., broadest entity class to narrowest entity class, alphabetical, relevancy, etc.) or random (e.g., sequenced in an arbitrary manner).

At step 515, a machine learning model is trained on the modified set of training data. The training comprises: iterative operations to find a set of parameters for the machine learning model that minimizes a loss or error function for the machine learning model, where each iteration includes finding the set of parameters for the machine learning model so that a value of the loss or error function using the set of parameters is smaller than a value of the loss or error function using another set of parameters in a previous iteration. The loss or error function is configured to measure a difference between (i) class outputs predicted for tokens recognized as named entities in the examples from the modified set of training data, and (ii) labels that provide ground truth information for the tokens. One or more of the named entities is a hierarchical entity, the class output predicted for a token recognized as a hierarchical entity is representative of multiple named entity classes, and the class output predicted for the token recognized as the hierarchical entity is compared to a composite label associated with the token to measure a difference between the predicted class output and the composite label. The iterative operations may further comprise inputting the examples from the modified set of training data into the machine learning model, and outputting the classes predicted for the named entities in each of the examples from the modified set of training data. The predicting the classes for the tokens in the examples comprises detecting one or more tokens as entities or keywords from a given example and categorizing the detected tokens into a relevant predetermined entity class.

In some instances, the training is a joint learning approach. The predicting step for the joint learning approach comprises: generating a sequence embedding for each of the examples, inputting the sequence embeddings into a first layer of the machine learning model, predicting, by the first layer, the class for the token recognized as the named entity in each of the examples, where the class is not representative of the composite label, and outputting, by the first layer, logits representative of the predicted class for the token recognized as the named entity in each of the examples. The logits are then combined with the sequence embeddings, respectively, to obtain new sequence outputs. The logits may be combined with the sequence embeddings by applying a linear transformation on the logits and concatenating the result of the linear transformation with the sequence embeddings, respectively. The predicting step for the joint learning approach further comprises: inputting the new sequence outputs into a second layer of the machine learning model, predicting, by the second layer, the class for the token recognized as the hierarchical named entity in the at least one of the examples, where the class is representative of the composite label, outputting, by the second layer, logits representative of the predicted class for the token recognized as the hierarchical named entity in the at least one of the examples, and generating a final class for the token in each of the examples based on the logits output from the first layer and the logits output from the second layer.

In certain instances, the predicting step for the joint learning approach may further comprise: inputting the new sequence outputs into a third layer of the machine learning model, predicting, by the third layer, the class for the token as part of an interval or duration in the at least one of the examples, where the class is representative of the composite label, outputting, by the third layer, logits representative of the predicted class for the token as part of the interval or duration in the at least one of the examples, and generating a final class for the token in each of the examples based on the logits output from the first layer, the logits output from the second layer, and the logits output from the third layer.

At step 520, the trained machine learning model is provided. For example, the trained machine learning model may be deployed within a chatbot system (e.g., as part of a skill bot) for recognizing one or more entities within utterances in various languages and/or text formats. In some instances, an utterance may be received (e.g., by a skill bot), the utterance may be tokenized into tokens, and the utterance and tokens may be analyzed by the trained machine learning model to predict a class for a token. In certain instances, the token is recognized as a hierarchical entity and the predicted class is representative of multiple named entity classes comprising at least a parent class and a child class associated with a composite label. In response to the predicted class being representative of multiple named entity classes, an entity hierarchy is extracted for the predicted class based on a hierarchical template associated with the composite label. The entity hierarchy comprises the parent and child classes in a hierarchical structure. The extracting the entity hierarchy comprises: accessing a matrix or database that maps hierarchical templates with composite labels, where the hierarchical templates are defined in a file format used to store and transmit data objects comprised of attribute—value pairs and arrays; identifying, using the matrix or database, the hierarchical template associated with the composite label; and disambiguating the predicted class into the entity hierarchy based on an attribute—value pair and array in the hierarchical template. The entity hierarchy lists out the parent and child classes in the hierarchical structure along with start and end information for a duration or interval child class. A response to the utterance is then generated based on the entity hierarchy. The entity hierarchy may be used in downstream processes, for example, by the chatbot to look up information related to the token based on the entity hierarchy, generate dialogue with the user based on the entity hierarchy, or a combination thereof.

Techniques for Increasing Volume of Training Data Through Guided Mining for Sequence Tagging FIG. 6 is a flowchart illustrating a process 600 for increasing volume of training data through guided mining for sequence tagging in accordance with various embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1-4B, the processing depicted in FIG. 6 may be performed by a pre-processing subsystem (e.g., pre-processing subsystem 210 or machine learning model training stage 410) to create, train, update, and deploy one or more predictive models (implemented as a token classifier) using training data sets optionally labelled with concatenated or composite labels.

At step 605, original training data comprising examples is accessed. Each of the original examples comprises context, a token associated with one or more named entities, or a combination thereof.

At step 610, guided data mining is performed on a language corpus using the context, the token associated with the one or more named entities, or the combination thereof from each of the original examples. The guided data mining comprises: extracting a lexicon of words and values from the context, the token associated with the one or more named entities, or the combination thereof from the original examples; performing a query on a language corpus using the lexicon to obtain an initial set of supplemental data comprising examples having one or more of the words and values from the context, the token associated with the one or more named entities, or the combination thereof; and filtering some examples from the initial set of supplemental data to obtain a final set of supplemental data comprising supplemental examples, where each of the supplemental examples comprise context, a token associated with one or more named entities, or a combination thereof that is similar to the context, the token associated with the one or more named entities, or the combination thereof from the original examples.

The filtering comprises a hierarchy-based filtering for identifying similar domain data, an embedding-based filtering for identifying similar embedded data, named entity-based filtering using a trained named entity recognition model, or any combination thereof. In some instances, the filtering comprises a hierarchy-based filtering for enterprise domain data. The hierarchy is analyzed and a list of domains which are related to the enterprise domain data is constructed, and examples are then filtered out from the initial set of supplemental data as out-of-domain data based on the list of domains. In some instances, the filtering comprises an embedding-based filtering for identifying similar embedded data. The embedding-based filtering comprises: generating embeddings for the original examples and the supplemental examples, comparing the embeddings for the original examples with the embeddings for the supplemental examples in a vector space using a vector similarity search technique, and retaining the supplemental examples with embeddings that are closest to the embeddings for the original examples as the final set of supplemental data. The closest is defined by a predetermined distance threshold.

At step 615, the supplemental examples are combined with the original examples to generate modified training data.

At step 620, a machine learning model is trained on the modified training data to generate a trained machine learning model.

At step 625, the trained machine learning model is provided. For example, the trained machine learning model may be deployed within a chatbot system (e.g., as part of a skill bot) for recognizing one or more entities within utterances in various languages and/or text formats. In some instances, an utterance may be received (e.g., by a skill bot), the utterance may be tokenized into tokens, and the utterance and tokens may be analyzed by the trained machine learning model to predict a class for a token. In certain instances, the token is recognized as a hierarchical entity and the predicted class is representative of multiple named entity classes comprising at least a parent class and a child class associated with a composite label. In response to the predicted class being representative of multiple named entity classes, an entity hierarchy is extracted for the predicted class based on a hierarchical template associated with the composite label. The entity hierarchy comprises the parent and child classes in a hierarchical structure. The extracting the entity hierarchy comprises: accessing a matrix or database that maps hierarchical templates with composite labels, where the hierarchical templates are defined in a file format used to store and transmit data objects comprised of attribute—value pairs and arrays; identifying, using the matrix or database, the hierarchical template associated with the composite label; and disambiguating the predicted class into the entity hierarchy based on an attribute—value pair and array in the hierarchical template. The entity hierarchy lists out the parent and child classes in the hierarchical structure along with start and end information for a duration or interval child class. A response to the utterance is then generated based on the entity hierarchy. The entity hierarchy may be used in downstream processes, for example, by the chatbot to look up information related to the token based on the entity hierarchy, generate dialogue with the user based on the entity hierarchy, or a combination thereof.

Illustrative Systems

Figure 7:
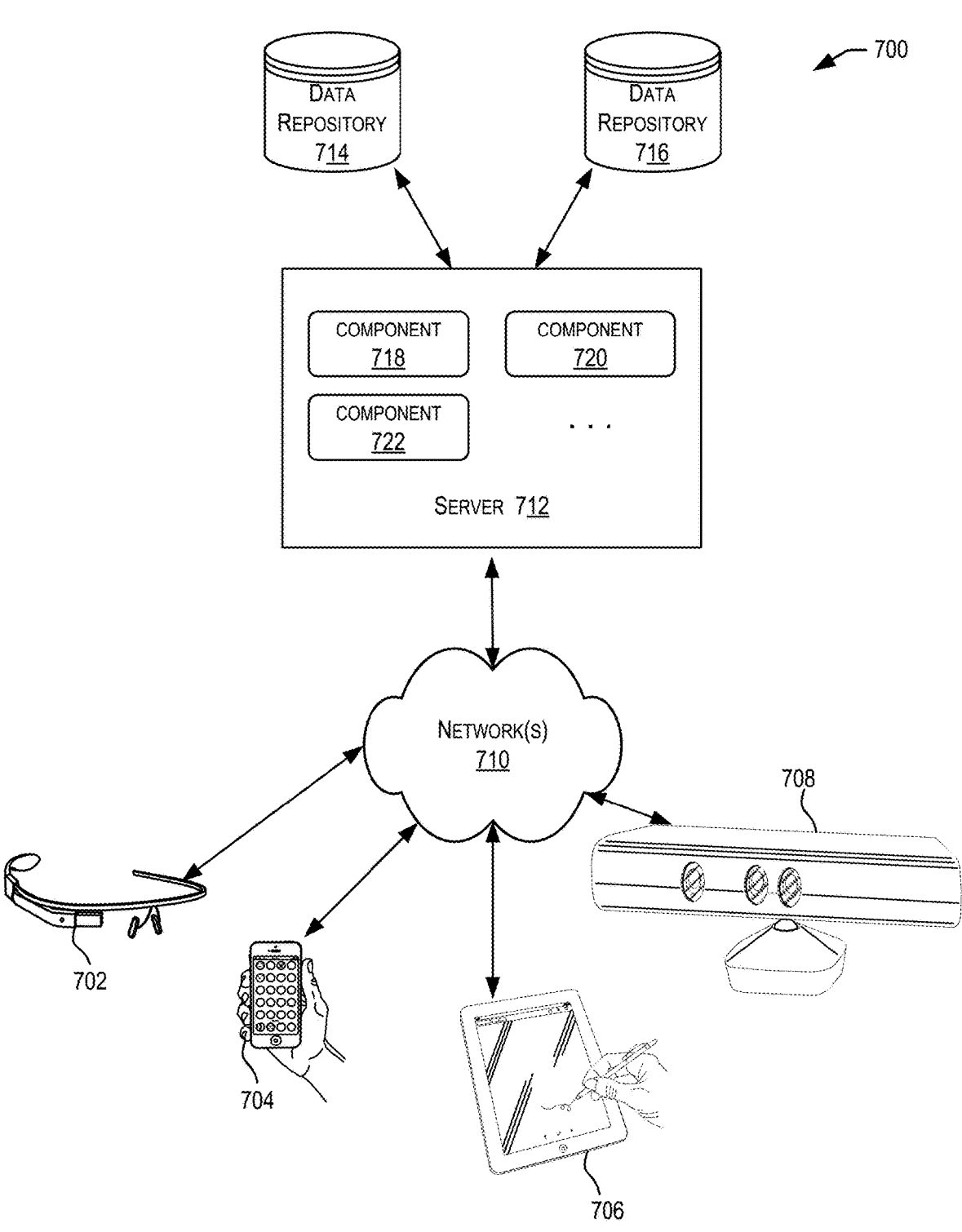
FIG. 7 depicts a simplified diagram of a distributed system for implementing various embodiments.

FIG. 7 depicts a simplified diagram of a distributed system 700. In the illustrated example, distributed system 700 includes one or more client computing devices 702, 704, 706, and 708, coupled to a server 712 via one or more communication networks 710. Clients computing devices 702, 704, 706, and 708 may be configured to execute one or more applications.

In various examples, server 712 may be adapted to run one or more services or software applications that enable one or more embodiments described in this disclosure. In certain examples, server 712 may also provide other services or software applications that may include non-virtual and virtual environments. In some examples, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The example shown in FIG. 7 is thus one example of a distributed system for implementing an example system and is not intended to be limiting.

Users may use client computing devices 702, 704, 706, and/or 708 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that may support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) 710 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 may include one or more virtual machines running virtual operating systems, or other computing architectures involving virtualization such as one or more flexible pools of logical storage devices that may be virtualized to maintain virtual storage devices for the server. In various examples, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain examples. For example, one or more of the data repositories 714, 716 may be used to store information such as information related to chatbot performance or generated models for use by chatbots used by server 712 when performing various functions in accordance with various embodiments. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain examples, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 714, 716 may also be used by applications to store application data. The data repositories used by applications may be of different types such as, for example, a key-value store repository, an object store repository, or a general storage repository supported by a file system.

Figure 8:
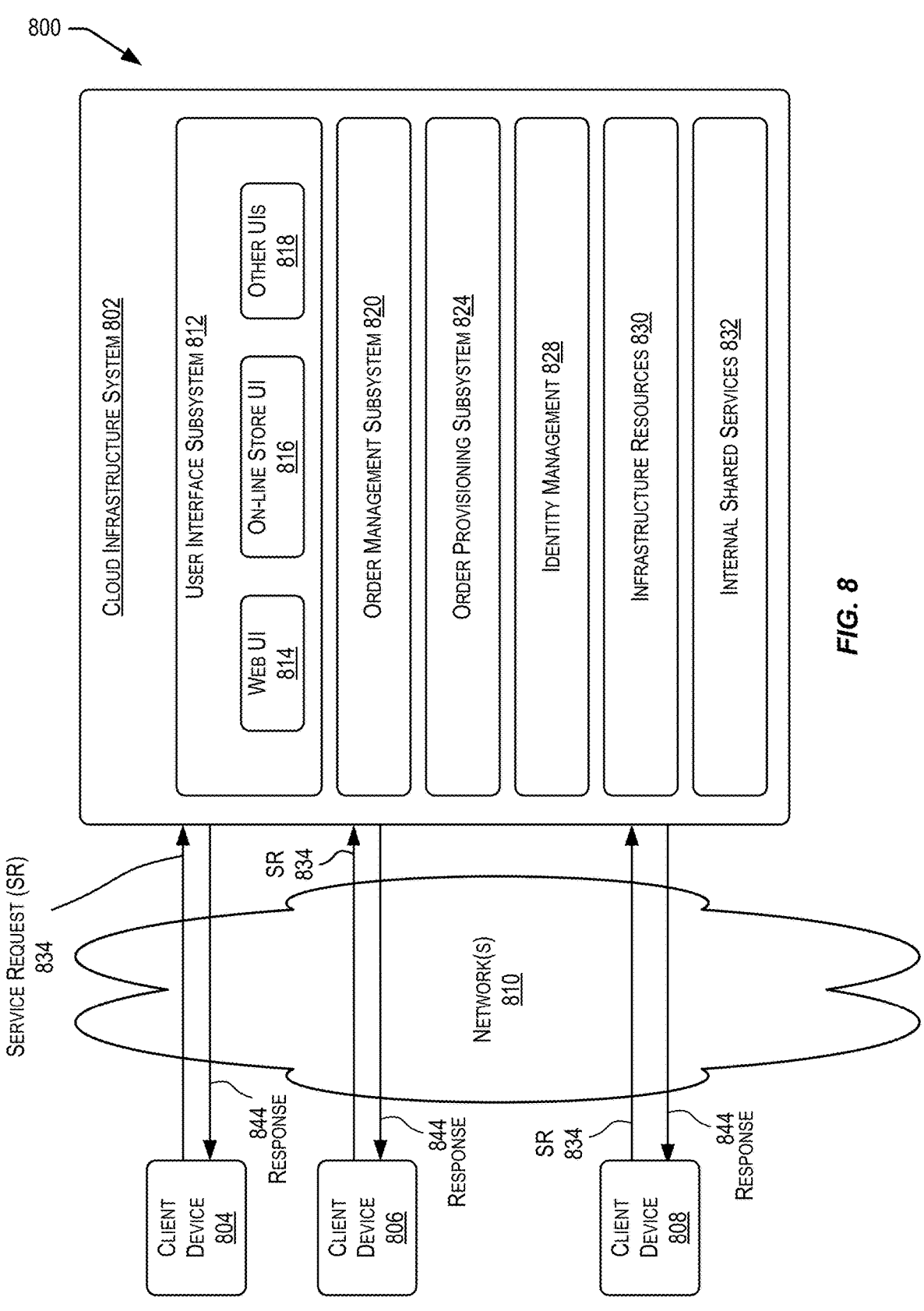
FIG. 8 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 8 is a simplified block diagram of a cloud-based system environment in which various services may be offered as cloud services in accordance with certain examples. In the example depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The example depicted in FIG. 8 is only one example of a cloud infrastructure system and is not intended to be limiting. It should be appreciated that, in some other examples, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative examples.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer may be an individual or an enterprise. In certain other examples, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 802 and the services provided may be shared by several organizations in a related community. Various other models such as hybrids of the above mentioned models may also be used.

Client computing devices 804, 806, and 808 may be of different types (such as client computing devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request information or action from a chatbot as described in this disclosure.

In some examples, the processing performed by cloud infrastructure system 802 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 802 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like. In certain examples, the storage virtual machines that are available for servicing storage requested from applications may be part of cloud infrastructure system 802. In other examples, the storage virtual machines may be part of different systems.

In certain examples, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for a service offered by cloud infrastructure system 802. As part of the order, the customer may provide information identifying a chatbot system for which the service is to be provided and optionally one or more credentials for the chatbot system.

In certain examples, such as the example depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 802 as part of the provisioning process. Cloud infrastructure system 802 may generate an application ID and select a storage virtual machine for an application from among storage virtual machines provided by cloud infrastructure system 802 itself or from storage virtual machines provided by other systems other than cloud infrastructure system 802.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 802 and information identifying a chatbot system selected by cloud infrastructure system 802 for the chatbot system corresponding to the chatbot system ID.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain examples, cloud infrastructure system 802 comprises an identity management subsystem (IMS) 828 that is configured to manage customer information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
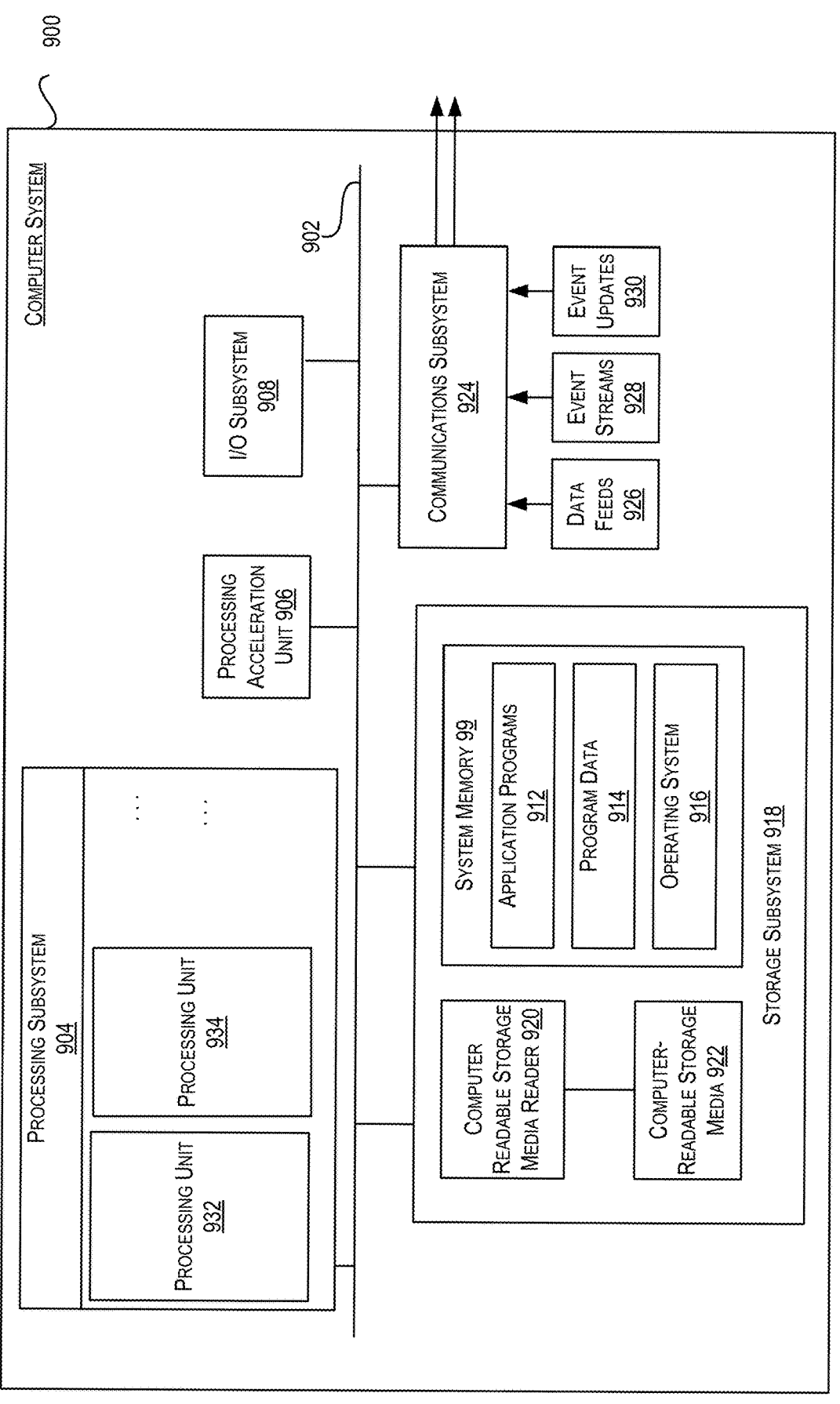
FIG. 9 illustrates an example computer system that may be used to implement various embodiments.

FIG. 9 illustrates an example of computer system 900. In some examples, computer system 900 may be used to implement any of the digital assistant or chatbot systems within a distributed environment, and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative examples of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 may be organized into one or more processing units 932, 934, etc. A processing unit may include one or more processors, one or more cores from the same or different processors, a combination of cores and processors, or other combinations of cores and processors. In some examples, processing subsystem 904 may include one or more special purpose co-processors such as graphics processors, digital signal processors (DSPs), or the like. In some examples, some or all of the processing units of processing subsystem 904 may be implemented using customized circuits, such as application specific integrated circuits (ASICs), or field programmable gate arrays (FP-GAs).

In some examples, the processing units in processing subsystem 904 may execute instructions stored in system memory 910 or on computer readable storage media 922. In various examples, the processing units may execute a variety of programs or code instructions and may maintain multiple concurrently executing programs or processes. At any given time, some or all of the program code to be executed may be resident in system memory 910 and/or on computer-readable storage media 922 including potentially on one or more storage devices. Through suitable programming, processing subsystem 904 may provide various functionalities described above. In instances where computer system 900 is executing one or more virtual machines, one or more processing units may be allocated to each virtual machine.

In certain examples, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some examples. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide authentication in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some examples. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 918 may also include a computer-readable storage media reader 920 that may further be connected to computer-readable storage media 922. Reader 920 may receive and be configured to read data from a memory device such as a disk, a flash drive, etc.

In certain examples, computer system 900 may support virtualization technologies, including but not limited to virtualization of processing and memory resources. For example, computer system 900 may provide support for executing one or more virtual machines. In certain examples, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, when computer system 900 is used to implement bot system 120 depicted in FIG. 1, the communication subsystem may be used to communicate with a chatbot system selected for an application.

Communication subsystem 924 may support both wired and/or wireless communication protocols. In certain examples, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some examples, communications subsystem 924 may provide wired network connectivity (e.g., Ethernet) in addition to or instead of a wireless interface.

Communication subsystem 924 may receive and transmit data in various forms. In some examples, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, subsystems, components or services are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
accessing training data comprising examples, wherein at least one of the examples comprise a particular token that is a hierarchical entity comprised of subsets of information and the particular token is labeled with multiple labels representing multiple named entity classes associated with the subsets of information;
concatenating the multiple labels into a composite label representing the multiple named entity classes;
for each of the at least one of the examples comprising the particular token labeled with the multiple labels, associating the composite label with the particular token to obtain a modified set of training data;
training a machine learning model on the modified set of training data, wherein the training comprises:
iteratively inputting the examples from the modified set of training data into the machine learning model;
predicting a final class for a token recognized as a named entity in each of the examples, wherein, for the at least one of the examples, the recognized named entity is the hierarchical entity and the predicted final class is representative of the multiple named entity classes, and wherein predicting the class comprises:
generating a sequence embedding for each of the examples;
inputting the sequence embeddings into a first layer of the machine learning model;
predicting, by the first layer, the class for the token recognized as the named entity in each of the examples, wherein the class is not representative of the composite label;
outputting, by the first layer, logits representative of the predicted class for the token recognized as the named entity in each of the examples;
combining the logits with the sequence embeddings, respectively, to obtain new sequence outputs;
inputting the new sequence outputs into a second layer of the machine learning model;
predicting, by the second layer, the class for the particular token recognized as the hierarchical named entity in the at least one of the examples, wherein the class is representative of the composite label;

outputting, by the second layer, logits representative of the predicted class for the particular token recognized as the hierarchical named entity in the at least one of the examples; and generating the final class for the token in each of the examples based on the logits output from the first layer and the logits output from the second layer;

comparing the final class predicted for the token in each of the examples to a label associated with the token, wherein, for the at least one of the examples, the particular token is associated with the composite label; and modifying model parameters of the machine learning model based on the comparing to minimize a difference between the final class predicted for each token and the label associated with said each token to generate a trained machine learning model; and providing the trained machine learning model.

2. The computer-implemented method of claim 1, wherein the logits are combined with the sequence embeddings by applying a linear transformation on the logits and concatenating the result of the linear transformation with the sequence embeddings, respectively.

3. The computer-implemented method of claim 1, wherein the predicting the final class further comprises:

inputting the new sequence outputs into a third layer of the machine learning model;

predicting, by the third layer, the class for the particular token as part of an interval or duration in the at least one of the examples, wherein the class is representative of the composite label;

outputting, by the third layer, logits representative of the predicted class for the particular token as part of the interval or duration in the at least one of the examples; and generating the final class for the token in each of the examples based on the logits output from the first layer, the logits output from the second layer, and the logits output from the third layer.

4. The computer-implemented method of claim 1, wherein the composite label is an ordered sequence of the multiple labels for the multiple named entity classes.

5. The computer-implemented method of claim 1, further comprising:

receiving an utterance from a user;

inputting the utterance into the trained machine learning model;

predicting, by the trained machine learning model, a class for a token in the utterance, wherein the token is recognized as a hierarchical entity and the predicted class is representative of multiple named entity classes comprising at least a parent class and a child class associated with a composite label;

extracting an entity hierarchy for the predicted class based on a hierarchical template associated with the composite label, wherein the entity hierarchy comprises at least the parent class and the child class in a hierarchical structure; and generating a response to the utterance based on the entity hierarchy.

6. The computer-implemented method of claim 5, wherein the extracting the entity hierarchy comprises:

accessing a matrix or database that maps hierarchical templates with composite labels, wherein the hierarchical templates are defined in a file format used to store and transmit data objects comprised of attribute-value pairs and arrays;

identifying, using the matrix or database, the hierarchical template associated with the composite label; and disambiguating the predicted class into the entity hierarchy based on an attribute-value pair and array in the hierarchical template.

7. The computer-implemented method of claim 5, wherein the entity hierarchy lists out the parent and child classes in the hierarchical structure along with start and end information for a duration or interval child class; and wherein the generating the response comprises looking up information related to the token based on the entity hierarchy, generating dialogue with the user based on the entity hierarchy, or a combination thereof.

8. A system comprising:

one or more processors; and one or more computer-readable media storing instructions which, when executed by the one or more processors, cause the system to perform operations comprising:

accessing training data comprising examples, wherein at least one of the examples comprise a particular token that is a hierarchical entity comprised of subsets of information and the particular token is labeled with multiple labels representing multiple named entity classes associated with the subsets of information;

concatenating the multiple labels into a composite label representing the multiple named entity classes;

for each of the at least one of the examples comprising the particular token labeled with the multiple labels, associating the composite label with the particular token to obtain a modified set of training data;

training a machine learning model on the modified set of training data, wherein the training comprises:

iteratively inputting the examples from the modified set of training data into the machine learning model;

predicting a final class for a token recognized as a named entity in each of the examples, wherein, for the at least one of the examples, the recognized named entity is the hierarchical entity and the predicted final class is representative of the multiple named entity classes, and wherein predicting the class comprises:

generating a sequence embedding for each of the examples;

inputting the sequence embeddings into a first layer of the machine learning model;

predicting, by the first layer, the class for the token recognized as the named entity in each of the examples, wherein the class is not representative of the composite label;

outputting, by the first layer, logits representative of the predicted class for the token recognized as the named entity in each of the examples;

combining the logits with the sequence embeddings, respectively, to obtain new sequence outputs;

inputting the new sequence outputs into a second layer of the machine learning model;

predicting, by the second layer, the class for the particular token recognized as the hierarchical named entity in the at least one of the examples, wherein the class is representative of the composite label;

outputting, by the second layer, logits representative of the predicted class for the particular token recognized as the hierarchical named entity in the at least one of the examples; and generating the final class for the token in each of the examples based on the logits output from the first layer and the logits output from the second layer;

comparing the final class predicted for the token in each of the examples to a label associated with the token, wherein, for the at least one of the examples, the particular token is associated with the composite label; and modifying model parameters of the machine learning model based on the comparing to minimize a difference between the final class predicted for each token and the label associated with said each token to generate a trained machine learning model; and providing the trained machine learning model.

9. The system of claim 8, wherein the logits are combined with the sequence embeddings by applying a linear transformation on the logits and concatenating the result of the linear transformation with the sequence embeddings, respectively.

10. The system of claim 8, wherein the predicting the final class further comprises:

inputting the new sequence outputs into a third layer of the machine learning model;

predicting, by the third layer, the class for the particular token as part of an interval or duration in the at least one of the examples, wherein the class is representative of the composite label;

outputting, by the third layer, logits representative of the predicted class for the particular token as part of the interval or duration in the at least one of the examples; and generating the final class for the token in each of the examples based on the logits output from the first layer, the logits output from the second layer, and the logits output from the third layer.

11. The system of claim 8, wherein the composite label is an ordered sequence of the multiple labels for the multiple named entity classes.

12. The system of claim 8, wherein the operations further comprise:

receiving an utterance from a user;

inputting the utterance into the trained machine learning model;

predicting, by the trained machine learning model, a class for a token in the utterance, wherein the token is recognized as a hierarchical entity and the predicted class is representative of multiple named entity classes comprising at least a parent class and a child class associated with a composite label;

extracting an entity hierarchy for the predicted class based on a hierarchical template associated with the composite label, wherein the entity hierarchy comprises at least the parent class and the child class in a hierarchical structure; and generating a response to the utterance based on the entity hierarchy.

13. The system of claim 12, wherein the extracting the entity hierarchy comprises:

accessing a matrix or database that maps hierarchical templates with composite labels, wherein the hierarchical templates are defined in a file format used to store and transmit data objects comprised of attribute-value pairs and arrays;

identifying, using the matrix or database, the hierarchical template associated with the composite label; and disambiguating the predicted class into the entity hierarchy based on an attribute-value pair and array in the hierarchical template.

14. The system of claim 12, wherein the entity hierarchy lists out the parent and child classes in the hierarchical structure along with start and end information for a duration or interval child class; and wherein the generating the response comprises looking up information related to the token based on the entity hierarchy, generating dialogue with the user based on the entity hierarchy, or a combination thereof.

15. One or more non-transitory computer-readable media for storing instructions which, when executed by one or more processors, cause a system to perform operations comprising:

accessing training data comprising examples, wherein at least one of the examples comprise a particular token that is a hierarchical entity comprised of subsets of information and the particular token is labeled with multiple labels representing multiple named entity classes associated with the subsets of information;

concatenating the multiple labels into a composite label representing the multiple named entity classes;

for each of the at least one of the examples comprising the particular token labeled with the multiple labels, associating the composite label with the particular token to obtain a modified set of training data;

training a machine learning model on the modified set of training data, wherein the training comprises:

iteratively inputting the examples from the modified set of training data into the machine learning model;

predicting a final class for a token recognized as a named entity in each of the examples, wherein, for the at least one of the examples, the recognized named entity is the hierarchical entity and the predicted final class is representative of the multiple named entity classes, and wherein predicting the class comprises:

generating a sequence embedding for each of the examples;

inputting the sequence embeddings into a first layer of the machine learning model;

predicting, by the first layer, the class for the token recognized as the named entity in each of the examples, wherein the class is not representative of the composite label;

outputting, by the first layer, logits representative of the predicted class for the token recognized as the named entity in each of the examples;

combining the logits with the sequence embeddings, respectively, to obtain new sequence outputs;

inputting the new sequence outputs into a second layer of the machine learning model;

predicting, by the second layer, the class for the particular token recognized as the hierarchical named entity in the at least one of the examples, wherein the class is representative of the composite label;

outputting, by the second layer, logits representative of the predicted class for the particular token recognized as the hierarchical named entity in the at least one of the examples; and generating the final class for the token in each of the examples based on the logits output from the first layer and the logits output from the second layer;

comparing the final class predicted for the token in each of the examples to a label associated with the token, wherein, for the at least one of the examples, the particular token is associated with the composite label; and modifying model parameters of the machine learning model based on the comparing to minimize a difference between the final class predicted for each token and the label associated with said each token to generate a trained machine learning model; and providing the trained machine learning model.

16. The one or more non-transitory computer-readable media of claim 15, wherein the logits are combined with the sequence embeddings by applying a linear transformation on the logits and concatenating the result of the linear transformation with the sequence embeddings, respectively.

17. The one or more non-transitory computer-readable media of claim 15, wherein the predicting the final class further comprises:

inputting the new sequence outputs into a third layer of the machine learning model;

predicting, by the third layer, the class for the particular token as part of an interval or duration in the at least one of the examples, wherein the class is representative of the composite label;

outputting, by the third layer, logits representative of the predicted class for the particular token as part of the interval or duration in the at least one of the examples; and generating the final class for the token in each of the examples based on the logits output from the first layer, the logits output from the second layer, and the logits output from the third layer.

18. The one or more non-transitory computer-readable media of claim 15, wherein the composite label is an ordered sequence of the multiple labels for the multiple named entity classes.

19. The one or more non-transitory computer-readable media of claim 15, wherein the operations further comprise:

receiving an utterance from a user;

inputting the utterance into the trained machine learning model;

predicting, by the trained machine learning model, a class for a token in the utterance, wherein the token is recognized as a hierarchical entity and the predicted class is representative of multiple named entity classes comprising at least a parent class and a child class associated with a composite label;

extracting an entity hierarchy for the predicted class based on a hierarchical template associated with the composite label, wherein the entity hierarchy comprises at least the parent class and the child class in a hierarchical structure; and generating a response to the utterance based on the entity hierarchy.

20. The one or more non-transitory computer-readable media of claim 19, wherein the extracting the entity hierarchy comprises:

accessing a matrix or database that maps hierarchical templates with composite labels, wherein the hierarchical templates are defined in a file format used to store and transmit data objects comprised of attribute-value pairs and arrays;

identifying, using the matrix or database, the hierarchical template associated with the composite label; and disambiguating the predicted class into the entity hierarchy based on an attribute-value pair and array in the hierarchical template.

* * * * *